(12) United States Patent
Sue et al.

(10) Patent No.: US 8,197,888 B2
(45) Date of Patent: Jun. 12, 2012

(54) DISPERSION, ALIGNMENT AND DEPOSITION OF NANOTUBES

(75) Inventors: Hung-Jue Sue, College Station, TX (US); Xing Cheng, College Station, TX (US); Dazhi Sun, College Station, TX (US); Huifeng Li, College Station, TX (US); Chien-Chia Chu, College Station, TX (US)

(73) Assignee: The Texas A&M University System, College Station, TX (US)

( * ) Notice: Subject to any disclaimer, the term of this patent is extended or adjusted under 35 U.S.C. 154(b) by 1047 days.

(21) Appl. No.: 12/112,675

(22) Filed: Apr. 30, 2008

(65) Prior Publication Data

US 2009/0035469 A1 Feb. 5, 2009

Related U.S. Application Data

(60) Provisional application No. 60/953,618, filed on Aug. 2, 2007, provisional application No. 61/015,474, filed on Dec. 20, 2007.

(51) Int. Cl.
*B05D 5/12* (2006.01)
*B05D 1/32* (2006.01)

(52) U.S. Cl. .................... 427/122; 427/282

(58) Field of Classification Search ............... 427/122, 427/282
See application file for complete search history.

(56) References Cited

U.S. PATENT DOCUMENTS

| 7,169,329 | B2 | 1/2007 | Wong et al. | |
|---|---|---|---|---|
| 2005/0154116 | A1* | 7/2005 | Nagy et al. | 524/492 |
| 2005/0187330 | A1* | 8/2005 | Gulari et al. | 524/442 |
| 2006/0231792 | A1* | 10/2006 | Drzal et al. | 252/188.28 |
| 2010/0197832 | A1* | 8/2010 | Sun et al. | 523/468 |

OTHER PUBLICATIONS

PCT/US2008/062078 International Search Report dated Jun. 22, 2009.

* cited by examiner

*Primary Examiner* — Frederick Parker
(74) *Attorney, Agent, or Firm* — Conley Rose, P.C.

(57) ABSTRACT

A dispersible nanocomposite comprising nanotubes associated with nanoplatelets. A method for creating an exfoliated nanotubes solution, aligning nanotubes and depositing them on a substrate or in matrix. In one embodiment, the method includes a nanocomposite of at least one nanotube electrostatically associated with at least one nanoplatelet. The nanoplatelets may be removed from the suspension by altering the ionic strength to create an exfoliated nanotube solution. The exfoliated nanotube solution for injection into microchannel templates and aligned deposition.

105 Claims, 30 Drawing Sheets

(A)

(B)

(C)

(A)

(B)

(A)

(B)

(A)

(B)

US 8,197,888 B2

DISPERSION, ALIGNMENT AND DEPOSITION OF NANOTUBES

CROSS-REFERENCE TO RELATED APPLICATIONS

This application claims benefit of U.S. provisional application No. 60/953,618 filed Aug. 2, 2007, entitled "Novel Method to De-Rope and Disperse Nanotubes in Organic and Inorganic Media" which is hereby incorporated herein by reference in its entirety for all purposes. This application also claims benefit of U.S. provisional application No. 61/015,474 filed Dec. 20, 2007, entitled "Nanotube Alignment and Placement" which is hereby incorporated herein by reference in its entirety for all purposes.

STATEMENT REGARDING FEDERALLY SPONSORED RESEARCH OR DEVELOPMENT

Not applicable.

BACKGROUND

1. Field of the Invention

This invention relates generally to the methods of manipulating nanotubes. More specifically, the invention relates to a method of dispersing nanotubes in solution for deposition.

2. Background of the Invention

Nanotubes are a novel class of nanostructures that exhibit remarkable mechanical, electrical, and thermal properties, thus having potential applications such as nanoscale probe devices, energy storage components, sensors, flame retardant materials, and electrical conductors in the aerospace, automotive, micro-electric, photovoltaic, and energy transmission industries. In addition, nanotubes may be constructed of a variety of different materials, including carbon, silicon, metal-oxide and other inorganic compounds. Nanotubes may be classified as multi-walled nanotubes (MWNT), few walled nanotubes (FWNT) and single walled nanotubes (SWNT).

Specifically, after synthesis SWNT nanotubes demonstrate an affinity for forming into roped, bundled or entangled configurations. The aggregated nanotube bundles do not yield the expected advantageous properties. The technical advantage of dispersing nanotubes for use in organic and inorganic media has implications in creating material with uniform nanotube distribution acting as a structural, mechanical, conductive or thermal component of the material.

Aggregation and bundling of nanotubes represents a constraint for implementation of these structures to maximize their advantageous properties in nanoscale applications. Furthermore, the homogeneous incorporation of nanotubes in compositions is restricted. Due to the difficulty in completely dispersing nanotube bundles, the differential control over the location and orientation of the individual nanotubes represent an additional hurdle to commercial applications. Methods utilizing high temperatures and lasers for post-deposition alignment have been academically tested. However, these methods are impractical for fabricating polymer nanocomposites and microelectronics with nanotubes, as the techniques ablate, damage, or alter the supporting substrate irreversibly.

Consequently, there is a need for a composition suitable for dispersing and manipulating nanotubes for the placement, alignment with high precision and order on a substrate or embedded therein.

BRIEF SUMMARY

These and other needs in the art are addressed in an embodiment by a nanocomposite comprising at least one nanotube electrostatically associated with at least one nanoplatelet. The nanocomposite creates a physical barrier to re-aggregation of the nanotubes. The nanocomposite further comprises exfoliated nanotubes and exfoliated nanoplatelets in a reversible association.

A nanocomposite prepared by oxidizing the nanotubes in solution, exfoliating the nanoplatelets in solution, and mixing solutions to create a nanocomposite solution. The nanocomposite further comprising exfoliated nanotubes.

A dispersed nanotube solution prepared by oxidizing the nanotubes in acid solution, exfoliating the nanoplatelets in base solution, and mixing solutions to create a nanocomposite solution. The nanocomposite solution further comprising at least one exfoliated nanotube associated with at least one exfoliated nanoplatelet. The dispersed solution prepared by removing nanoplatelets from solution ionically, and homogeneously re-dispersing the nanotubes in other media.

A method for creating the nanocomposite and using the nanocomposite to create aligned nanotube structures. The method comprising oxidizing the nanotubes in solution, exfoliating the nanoplatelets in solution, and mixing the solutions to create a nanocomposite solution. The nanocomposite solution further comprising an exfoliated nanotube solution. The method further comprising injecting the solution into a template, removing the liquid from the solution to deposit the nanotube film, and removing the template.

A method for placing at least one nanotube in a specific location on a substrate. The method comprising altering the surface of the substrate, positioning a template, injecting a nanotube suspension, and allowing the nanotube to associate with the substrate. The surface of the substrate altered to incorporate a nanotube receptor.

A method of preventing nanotube aggregation in solution. The method comprising oxidizing the nanotubes in acid solution, exfoliating the nanoplatelets in solution. Further mixing the nanotube solution and the nanoplatelet solution to create a nanocomposite solution.

The foregoing has outlined rather broadly the features and technical advantages of the invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

NOTATION AND NOMENCLATURE

Figure 1:
FIG. 1 is a transmission electron micrograph of oxidized carbon nanotube bundles.

Certain terms are used throughout the following descriptions and claims to refer to particular system components. This document does not intend to distinguish between components that differ in name but not function.

As used herein, the term "nanotube(s)" or NT(s) refers to any cylindrical atomic allotrope or polyatomic molecule with a diameter of about at least about 0.7 nm, a length greater than about 30 nm, an aspect ratio (length to diameter ratio) of at least about 10 and outer walls comprising one or more layers.

As used herein the term "single walled nanotube(s)" or "SWNT(s)" refers to any nanotube with outer walls comprising one layer. Additionally, the term "multi-walled nanotube(s)" or "MWNT(s)" refers to any nanotube with outer walls comprising at least 2 layers, as used herein.

As used herein, the term "carbon nanotube(s)" or CNT(S) refers to any cylindrical carbon allotrope, with a diameter of about 0.7 nm, and outer walls comprising one or more graphene layers.

Also, as used herein, the terms "disperse", "de-rope" or "de-bundle" refer to the substantial separation or disentanglement of individual nanotubes from a bundle, rope, aggregate, clump, intertwined, or similar conformation compromising one or more nanotubes in association with each other.

Additionally, as used herein, the term "exfoliate" relates to the process of removing a layer from a material. "Exfoliated" as used herein refers to a nanostructure that has been stripped to one layer. Alternatively, "exfoliated" as used herein refers to individually dispersed, or monodisperse nanotubes.

In addition, as used herein, the term "nanocomposite" or "hybrid" refers to a combination of, mixture of, or composite of the materials preceding or proceeding the term but is not limited to only the included materials.

Furthermore, as used herein, the term "microchannels" is used to relate to channels within a substrate or bulk material with a cross sectional diameter of at maximum 1 millimeter.

DETAILED DESCRIPTION OF THE PREFERRED EMBODIMENTS

The nanotubes manipulated in the disclosed invention are any commercially available. The nanotubes employed in embodiments of the disclosed method are of any synthetic classification, as understood by those skilled in the art. The nanotubes are comprised of any materials such as, but not limited to carbon, silicon, metals or inorganic compounds. The nanotubes comprise, without limitation, single walled nanotubes, few walled nanotubes, multi-walled nanotubes or combinations there of. The nanotubes have a diameter of between about 1 nm and about 30 nm, preferably between about 1 nm and about 10 nm. The nanotubes have an aspect ratio, or length to diameter ratio, of at least about 20, preferably the nanotubes aspect ratio is at least about 30, and most preferably the aspect ratio is at least about 1,000.

The nanotubes are carbon nanotubes. The carbon nanotubes have a diameter of between about 1 nm and about 20 nm. The carbon nanotube length is at least about 100 nm. In certain embodiments, the length is at least 1000 nm. The carbon nanotube aspect ratio is at least 20, in certain embodiments the aspect ratio is at least 1,000. The carbon nanotubes comprise single walled carbon nanotubes (SWCNTs) or multi-walled carbon nanotubes (MWCNTs).

The nanotubes are functionalized nanotubes. Functionalized nanotubes comprise nanotubes that have chemically treated outer walls to include functional groups. Chemical treatment comprises exposure to a chemically active media. In certain embodiments, functionalized nanotubes comprise oxidized nanotubes. Oxidation of the nanotubes is at least about 1%, and more preferable at least at about 4%. In embodiments, one or more nanotubes are admixed in an acid solution to form oxidized nanotubes. The acid solution comprises any acid known to those skilled in the art. Preferably, the acid solution is a strong acid. Further, the acid solution comprises a mixture of strong acids. Examples of suitable acids include without limitation, concentrated sulfuric acid, concentrated nitric acid and combinations thereof. In certain embodiments, the strong acid solution comprises a concentrated sulfuric acid to concentrated nitric acid in a volume ratio of about 3:1. The nanotubes are oxidized in the strong acid solution by mixing the nanotubes using an ultrasonicator for between about one hour and about five hours, preferably between about two hours and five about hours, and most preferably for about two hours to about three hours. The nanotubes are ultrasonicated at about room temperature. After sonication in acid, the oxidized nanotube aggregates are splayed at the ends into negatively charged carboxylic groups.

FIG. 1 illustrates a transmission electron micrograph of oxidized carbon nanotubes 10. The carbon nanotubes remain bundled or roped in aggregates. The oxidized nanotubes 10 have a negative electrostatic charge on the outer surface of the nanotube wall. The oxidized nanotubes are isolated from the acid, for example the nanotubes are isolated by filtration under vacuum. The isolated nanotubes are re-suspended in an aqueous solution. The aqueous solution may be any of those known to one skilled in the art such as, de-ionized water. The weight percent (wt %) concentration of nanotubes in aqueous solution ranges from 0.001% to 5%, more preferably 0.1% to 0.3%, and most preferably from 0.1% to 0.2%.

Nanoplatelets are nanoparticles having a thin, planar geometry. The nanoplatelets have a diameter range from about 10 nm to about 20,000 nm, and preferably the nanoplatelet diameter is between about 100 nm and 1000 nm. Nanoplatelets have an aspect ratio, diameter to thickness ratio, of between about 10 to about 20,000; preferably the aspect ratio is between about 100 and about 4000; and most preferably between about 100 and 500. Additionally, the nanoplatelets may comprise any suitable shape without limitation, such as circular, rectangular, triangular, etc. Furthermore, the nanoplatelets may comprise any suitable material, as known to one skilled in the art without limitation, such as clay, nanoclay, graphite, inorganic crystal, organic crystal or combinations thereof. In certain embodiments nanoplatelets are comprised of an inorganic crystal; such as alpha-zirconium phosphate (ZrP).

The nanoplatelets are exfoliated. Exfoliated nanoplatelets are chemically separated into individual crystalline layers. Exfoliated nanoplatelets have a positive electrostatic charge on the surface of both sides. Exfoliated nanoplatelets are created in a chemically active media. The chemically active media is a basic-aqueous solution. The aqueous solution may comprise any solution known to those skilled in the art that will exchange protons. Examples of suitable solutions that may be used include alcohol-water, amine bases, hydrocarbon solutions, salt solutions, aqueous base solutions or combinations thereof. The solution is an aqueous tetra-n-butylammonium hydroxide ($TBA^+OH^-$) solution. The aqueous solution comprises de-ionized water. The molar weight ratio of nanoplatelets to base in aqueous solution ranges from about 1:0.05 to about 1:2, preferably from about 1:0.05 to about 1:1, and more preferably from about 1:0.07 to about 1:0.09.

Without being limited by theory, in the exfoliated nanoplatelet solution, a base (e.g. $TBA^+$) covers the surface of the platelets and forms highly charged $P{-}O^-/TBA^+$ ion pairs. $TBA^+$ ions are bulky with a diameter of around 1 nm, which is much larger than $O^-$. The positive charge comes from $N^+$ in the center of the molecule. When paired with $P{-}O^-$ on the surface of the platelets, the positive ion does not come close to the negative charge due to the hindrance of the butyl chains, thus allowing the plate-like surface to exhibit strong positive charge. The reaction time and/or concentrations of reactants may be varied to obtain ZrP with the designed range of aspect ratios.

In order to exfoliate and disperse the oxidized nanotubes, the aqueous-oxidized nanotube solution and aqueous-exfoliated nanoplatelet solution are admixed. The combined nanotube/nanoplatelet solution is agitated for a period of time ranging from about 10 minutes to about 60 minutes. Examples of agitation methods that may be used include without limitation shaking, stirring, sonication or other mechanical means; preferably, the mixture is stirred. After initial mechanical agitation, the mixture is homogenized by ultra-sonication. The temperature is from about 4° C. to about 80° C., preferably from about 20° C. to about 40° C., and most preferably from about 20° C. to about 30° C. The solution is ultrasonicated at approximately room temperature. The solution is ultrasonicated for about 0.5 hour to about 12 hours, preferably from about 2 hours to about 12 hours, and most preferably 2 hours to about 8 hours. In certain embodiments, the time and temperature are dependent on sonicator power and bath efficiency. After ultra-sonication the aqueous nanotube/nanoplatelet solution is a homogenous solution of dispersed nanotubes and associated nanoplatelets.

The exfoliation and dispersion of nanotubes is attributed to the presence of the nanoplatelets. Without being limited by theory, the negatively charged surface of nanotubes attracts the positively charged surface of the nanoplatelets. By mixing the positively charged nanoplatelets with negatively-charged bundled nanotubes, the nanoplatelets are attached onto the nanotube side walls, then entering the bundles and forcing nanotube bundles into individual tubes during ultrasonication. The nanoplatelets are electrostatically tethered to the nanotubes. After the separation of the nanotubes, the nanoplatelets have individual tubes attached on their surfaces. The nanoplatelets cannot be re-stacked together to form regular layered structures due to the presence of nanotubes. Thus each nanoparticle interferes with the re-aggregation of the other by a steric or physical hindrance effect. The hindering effect comes from the two-dimensional heterogeneous shapes of the nanoplatelets interfering with other nanoplatelets associated with nearby nanotubes. The surface charge and two-dimensional nature of exfoliated nanoplatelets disperse the nanotubes and hinder the re-aggregation thereof. The nanotubes dispersed by the nanoplatelets are exfoliated. The nanotubes and nanoplatelets are electrostatically associated. The nanotubes associated with the nanoplatelets comprise a nanocomposite.

In order to resuspend the nanocomposite in other liquids, the aqueous solution is dried. The solution is dried by heating in an oven at 100° C. until the water is removed. After drying the aqueous solution, the nanoplatelets are covered with individual nanotubes, leaving a hybrid powder. The hybrid powder comprises a nanocomposite powder. The nanocomposite powder may be re-suspended in organic, inorganic, polymer, proteinaceous solutions. Solvents include without limitation water, acetone, and toluene. Polymer solutions include without limitation, thermoplastics, thermosets, polyvinylics, epoxies, and other polymeric systems known to those skilled in the art. Proteinaceous solutions may include nucleic acid solutions, enzyme solutions or other solutions as known to those skilled in the art.

Figure 2:
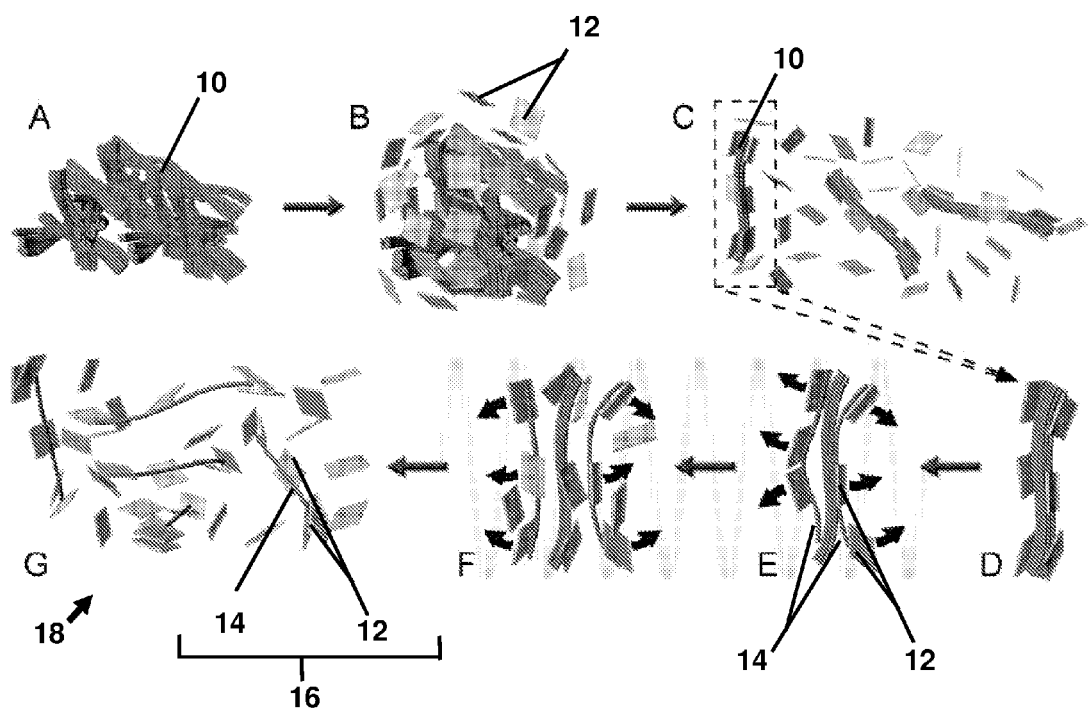
FIG. 2 is a conceptual schematic of the interaction between carbon nanotubes and nanoplatelets according to an embodiment of the invention.

Without wishing to be limited by theory, FIG. 2 illustrates a conceptual schematic of the invention for dispersing nanotubes in solution with nanoplatelets. As illustrated in FIG. 2A, the oxidized nanotubes 10 form bundled aggregations. The oxidized nanotubes 10 are admixed with exfoliated nanoplatelets 12 as illustrated in FIG. 2B. The nanoplatelets 12 intercalate into the oxidized nanotube bundles 10 and begin associating with individual nanotubes 14. In FIGS. 2E and 2F the electrostatically associated individual nanotubes 14 are pulled from the oxidized nanotube bundles. FIG. 2G illustrates the nanocomposite 16 comprising the nanotube-nanoplatelet complex in an exfoliated nanotube solution 18.

The nanocomposite can be separated by altering the ionic strength of the solution. Altering the ionic strength of the solution comprises adding a salt to the solution. In certain embodiments, the salt is potassium chloride (KCl). The concentration of the salt is between about 0.01 mol/L (moles per liter) and about 0.10 mol/L, preferably between about 0.01 mol/L and about 0.05 mol/L, and most preferably about 0.01 mol/L. The nanotubes are isolated from the nanoplatelet solution by centrifugation.

The nanotubes may be re-suspended in a surfactant to create an exfoliated nanotube dispersion or an exfoliated nanotube solution. Examples of suitable surfactants include polyvinyl pyrrolidone (PVP), sodium dodecyl sulfate (SDS) and polyoxypropylene-polyethylene block copolymer (Pluronic® F108). The surfactant may be any known to one skilled in the art for suspending oxidized and exfoliated nanotubes. The surfactant is an aqueous 1 wt % sodium dodecyl sulfate (SDS) solution.

Figure 3:
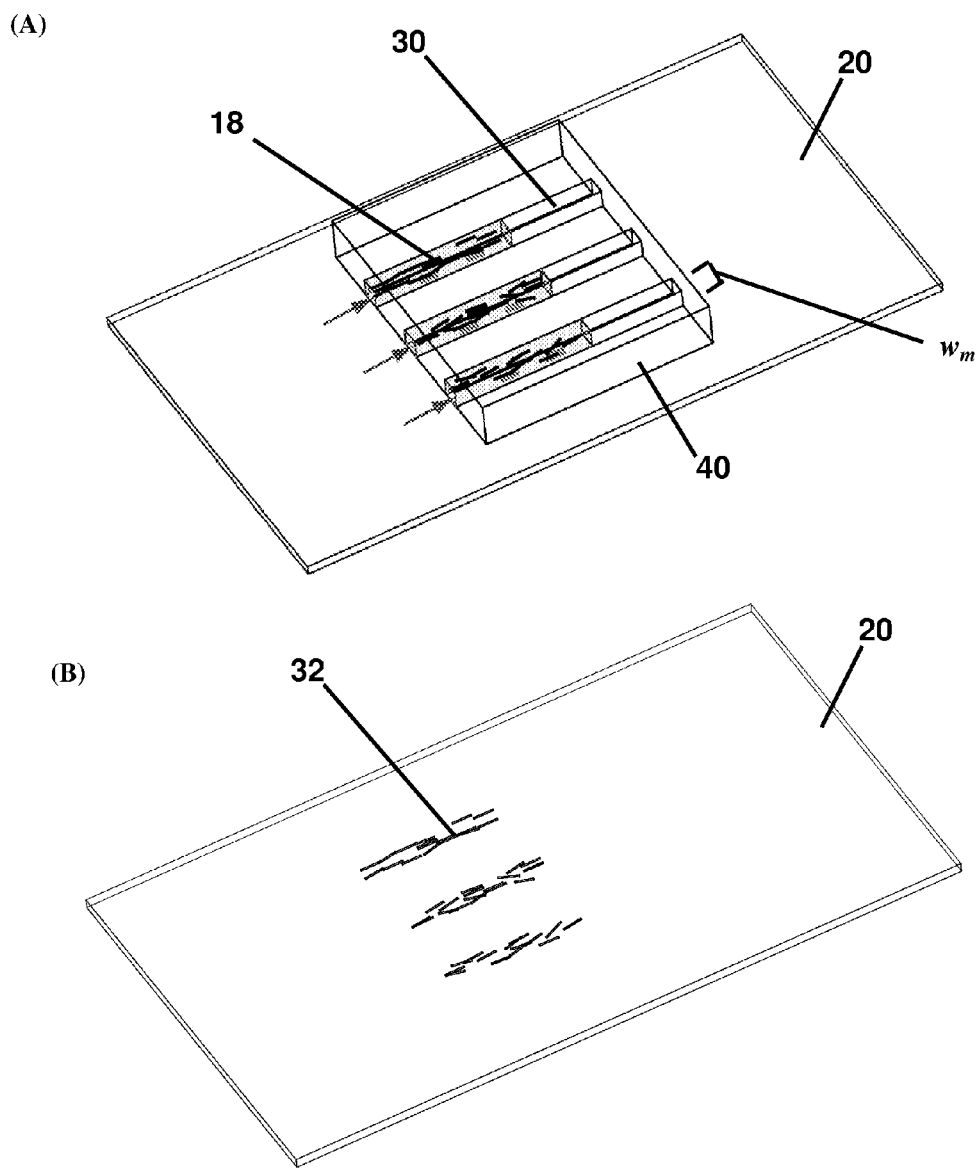
FIG. 3 illustrates deposition of nanotubes in an aligned manner according to an embodiment of the invention.

The exfoliated nanotube dispersion is used in applications where it is advantageous to have a nanotube solution for deposition protocols. In particular, the dispersion of nanotubes in solution allows the alignment of nanotubes when the exfoliated nanotube dispersion is forced through narrow fluid passages. FIG. 3 illustrates an embodiment of nanotube alignment on a substrate surface 20 by microfluidic channels or microchannels 30. Microchannels 30 comprise fluid vessels for directing and containing a liquid. Without being limited by theory, by injecting or forcing a nanotube suspension through a microchannel 30, the nanotube aligns itself in the elongate direction of the vessel walls during transportation into the microchannel. A suspension of one or more nanotubes 18 is forced into a vessel with a cross-sectional dimension $w_m$, which is shorter than the length of the nanotube. The dimension $w_m$ is at greatest about half the length of the exfoliated nanotubes. Larger channels can diminish the alignment within the nanotube suspension 18 during drying due to Brownian motion, or random motion of the nanotubes, within the suspension. The smaller cross-section $w_m$ of the microchannels physically restrains the nanotubes from motion.

Referring now to FIGS. 3A and 3B, the microchannels 30 may be in a removable template 40. In an embodiment, the template 40 is placed on the substrate 20. The substrate 20 may be comprised of polymer sheets, semiconductor wafers, metals, alloys, ceramics, glass or other materials desirable for supporting nanotube films 32. After injecting the exfoliated nanotube suspension into the microchannel template 40, the fluid is dried or evaporated so that the aligned nanotubes are deposited on the substrate as a nanotube film 32. The nanotube film 32 comprises nanotubes that are oriented in the direction of the microchannel 30. Drying can be conducted at by room temperature, elevated temperature, under vacuum or other process known to one skilled in the art, without limitation. After the deposition of the nanotube film 32, the microchannel template 40 may be removed, such that nanotube films 32 of aligned nanotubes remain on the surface of the substrate 20.

Figure 4:
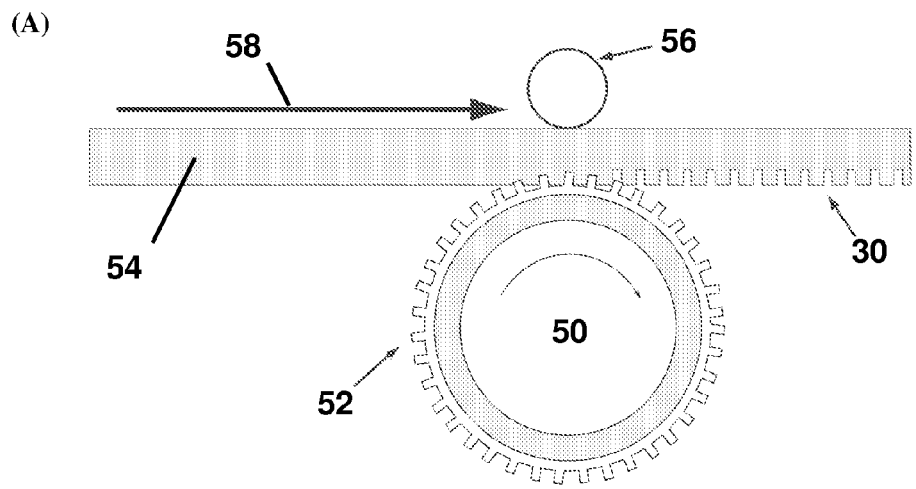
FIG. 4 illustrates a schematic for manufacturing deposition templates according to an embodiment of the invention.
Figure 4:
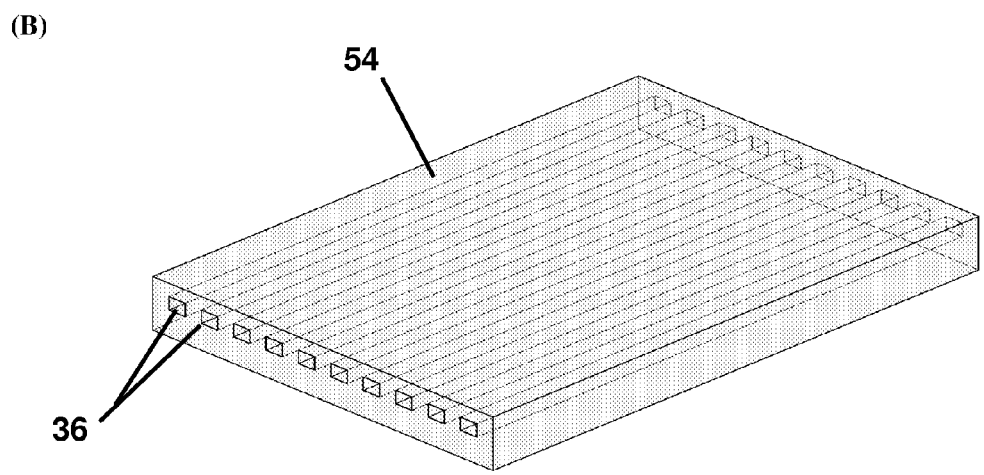

FIG. 4A illustrates a template manufacturing technique for creating a template one or more microchannels 30 for depositing nanotube film 32 using an exfoliated nanotube solution 18. A cylinder 50 includes a template 52 about the circumference. The cyclinder 50 and template 52 acts as Gravure cylinder. The template 52 creates microchannels 30 in a suitable template or substrate material 54 from directional substrate feed 58. A pressure roller 56 pushes the substrate 54 onto the cylinder 50 so that the substrate conforms fully to the template 52. The pressure roller 56 further comprises a means to heat the substrate 54. The cylinder 50 allows construction of the microchannel-containing substrate material 54 in a continuous fashion. A continuous substrate production system is advantageous for reducing cost of producing a substrate with embedded aligned nanotubes.

Referring now to FIGS. 4A and B, from the cylinder 50 the substrate 54 may be cut, folded, pressed, or altered in other manners so as to create internal microchannels 36. Without being limited by theory, a substrate 54 such as described herein above is pressed onto a mold and/or template 52 at elevated temperature. Generally, the temperature of the substrate 54 is raised to above the glass transition temperature, such that the substrate 54 conforms to the template 52. After cooling, two such substrates 54 comprising at least one microchannel 30 may be pressed together, so that the microchannels 36 are completely encapsulated within the substrate matrix.

Processes to introduce the exfoliated nanotube solution into the microchannels include substrate immersion, micronozzle injection or negative pressure vacuum pumping, without limitation. In embodiments, after filling the microchannels 36 with the exfoliated nanotube solution, the substrate is left to dry. Drying the substrate allows deposition of the nanotubes along the microchannels 36. Further repetitions of the process of injection and drying may be conducted to achieve desired thickness of the aligned nanotube film. Alternatively, higher concentrations of nanotubes in solution may be used. The substrate may be heated above the glass transition temperature, and pressurized, such that the remaining airspaces collapse around the nanotubes.

Figure 5:
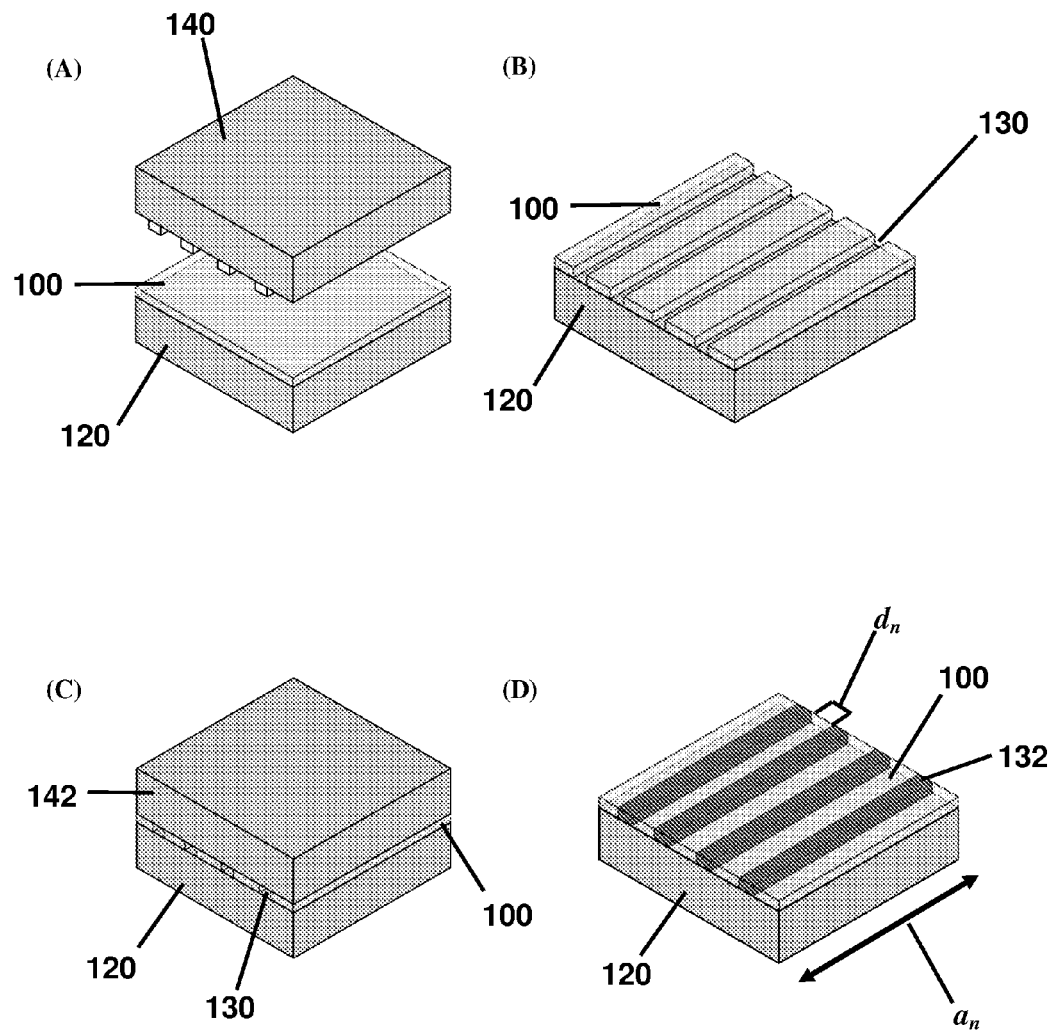
FIG. 5 illustrates an embodiment of deposition of aligned nanotubes in thin films according to an embodiment of the invention.

FIG. 5 illustrates an embodiment of creating single layered thin films incorporating aligned nanotubes from the exfoliated nanotube solution. Film 100 is coated onto a supporting substrate 120. Suitable films include polymer films, metallic films, ceramic films, self assembled monolayers, biological films, or similar coatings applied to a substrate surface, without limitation. Portions of the film 100 are removed by template 140 to create microchannels 130 as illustrated in FIGS. 5A and 5B. Microchannels 130 may be created by etching, bleaching, ablation, imprinting or other techniques as known by one skilled in the art. An additional substrate cover 142 is placed over the microchannels 130 as in FIG. 5C. The exfoliated nanotube solution is injected into the microchannels 130. After deposition of the nanotubes on the supporting substrate 120, between the strips of the film 100, the cover 142 is removed. The deposited nanotubes 132 are aligned in direction $a_n$ on the surface of the substrate 120 due to the direction of the microchannels 130 in the film 100. The deposited nanotubes 132 illustrated in FIG. 5D comprise aligned nanotubes that fill or partially fill the microchannels 130 within the film 100, on the substrate 120.

Figure 6:
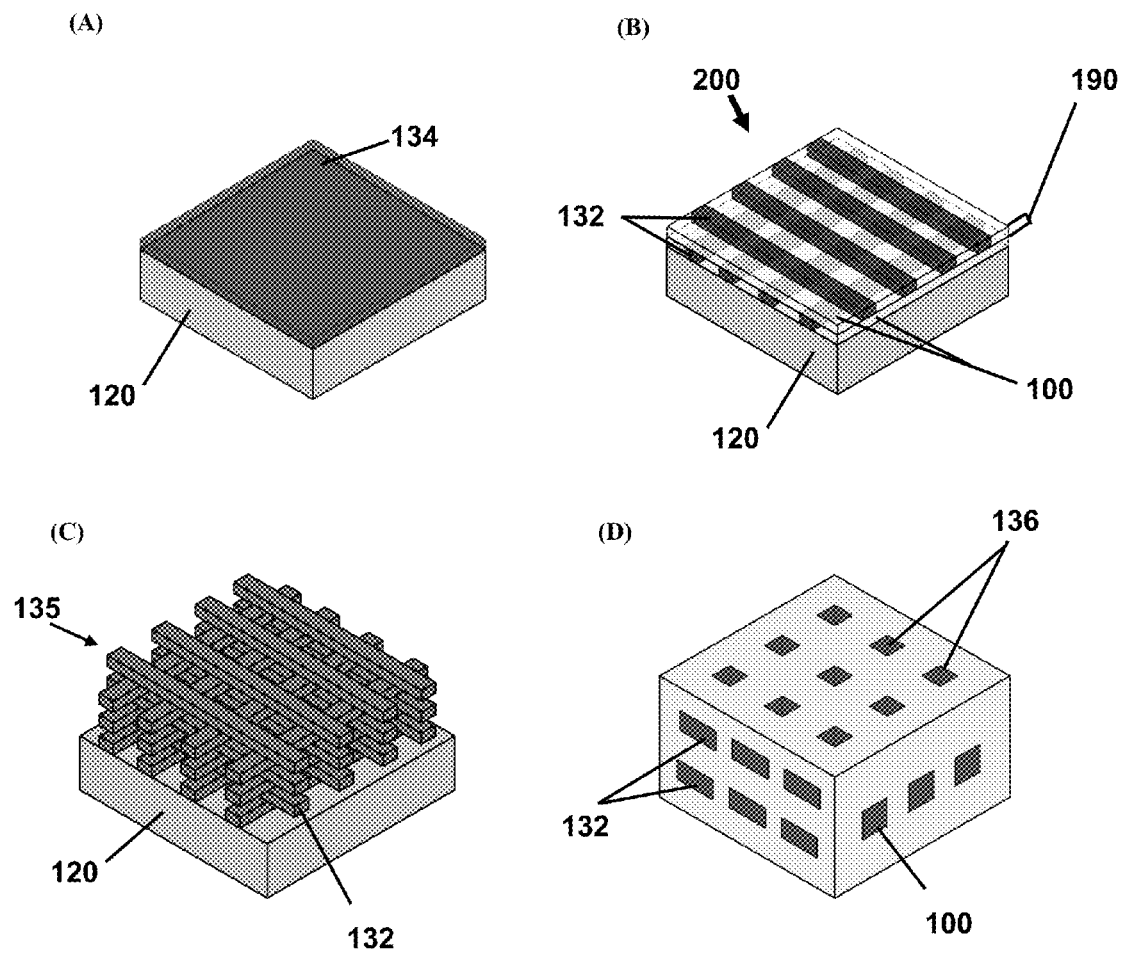
FIG. 6 illustrates manufacturing a complex matrix of aligned nanotubes with in a substrate material according to an embodiment of the invention.

Referring now to FIG. 5 and FIG. 6A, the substrate 120 may be covered by a layer 134 of nanotubes by removing the film 100 from between the deposited nanotubes 132. The film 100 between deposited nanotubes is removed by etching, bleaching, ablation, imprinting or other techniques as known by one skilled in the art. The substrate cover 142 is placed over the deposited nanotubes 132 and the exfoliated nanotube solution is injected into microchannels between the deposited nanotubes 132. In order to maintain nanotube alignment $a_n$ the cross-sectional dimension $d_n$ between previously deposited nanotube strips is shorter than the length of the nanotubes. In certain embodiments, the cross-sectional dimension $d_n$ is less than about half the length of the nanotubes. Removing the substrate cover 142 results in a complete layer, sheet or film 134 of aligned nanotubes as illustrated in FIG. 6A.

Referring now to FIG. 6b, multiple thin film layers 190 with deposited nanotubes 132 within film 100 may be sequentially assembled upon a substrate 120 to create a matrix 200 of aligned nanotubes. Without being limited by theory, transfer bonding between the layers 190 allows multiple layers to be combined into a matrix 200. The layers 190 may be attached, associated, or bonded together by any means known to one skilled in the art, in order to assemble a matrix 200 of aligned nanotubes. The number of film layers 190 may be any desired as known to assemble a matrix 200. Furthermore, the direction of the nanotubes 132 in the layers 190 of the matrix 200 may be in any direction, orientation and/or relationship compared to the nanotubes 132 in adjacent layers.

Without being limited by theory, the aligned nanotubes 132 deposited in the layers 190 from the exfoliated solution allow a polymer-nanotube composite film to be constructed to include pre-designed conductivity anisotropy. The film 100 maybe removed to create an aligned structure consisting of nanotubes or scaffold 135. The scaffold 135 as illustrated in FIG. 6C, comprises aligned nanotubes 132 to create a porous structure. Furthermore, other materials such as metal, dielectrics, and functional materials can be inserted into the scaffold to form novel nanocomposites. It may also be used as a light weight material that has good thermal and electrical properties. For example, this material can be used as heat dissipater. The aligned nanotube structure can draw heat away from the source and the porous structure allows air or water to quickly remove the heat. Control over the direction, sequence, depth and alignment of the nanotube deposition is advantageous for further control the thermal and electrical conductivity of the scaffold 135.

The deposited nanotubes 132 are oriented between layers 191 as illustrated in FIG. 6D. The exfoliated nanotube solution can be deposited running vertically between layers with vertical via holes 136. Without being limited by theory, via holes 136 in the film 100 may be created by differential deposition of film layers. Alternatively, the film 100 is removed by etching, bleaching, ablation, imprinting or other techniques as known by one skilled in the art to create via holes 136. The via holes 136 are microchannels that are oriented in at least two planes. Without being limited by theory, the exfoliated nanotube solution is deposited in the via holes 136 before or after the nanotubes are deposited in the microchannels 130.

It can be envisioned that the steps described hereinabove can be repeated as necessary to create interconnected vertical and in-plane microchannels within the matrix 200. The exfoliated nanotube solution may be injected, vacuum pulled, or forced by another means into the microchannels 130 or via holes 136 in any sequence. The microchannels 130 and via holes 136 increase the achievable deposited nanotube 132 patterns embedded within the substrate matrix. The deposition of nanotubes within a substrate or film may, without limitation, enhance conductivity, increase tensile strength, increase shear resistance or improve other mechanical properties as known to one skilled in the art.

Figure 7:
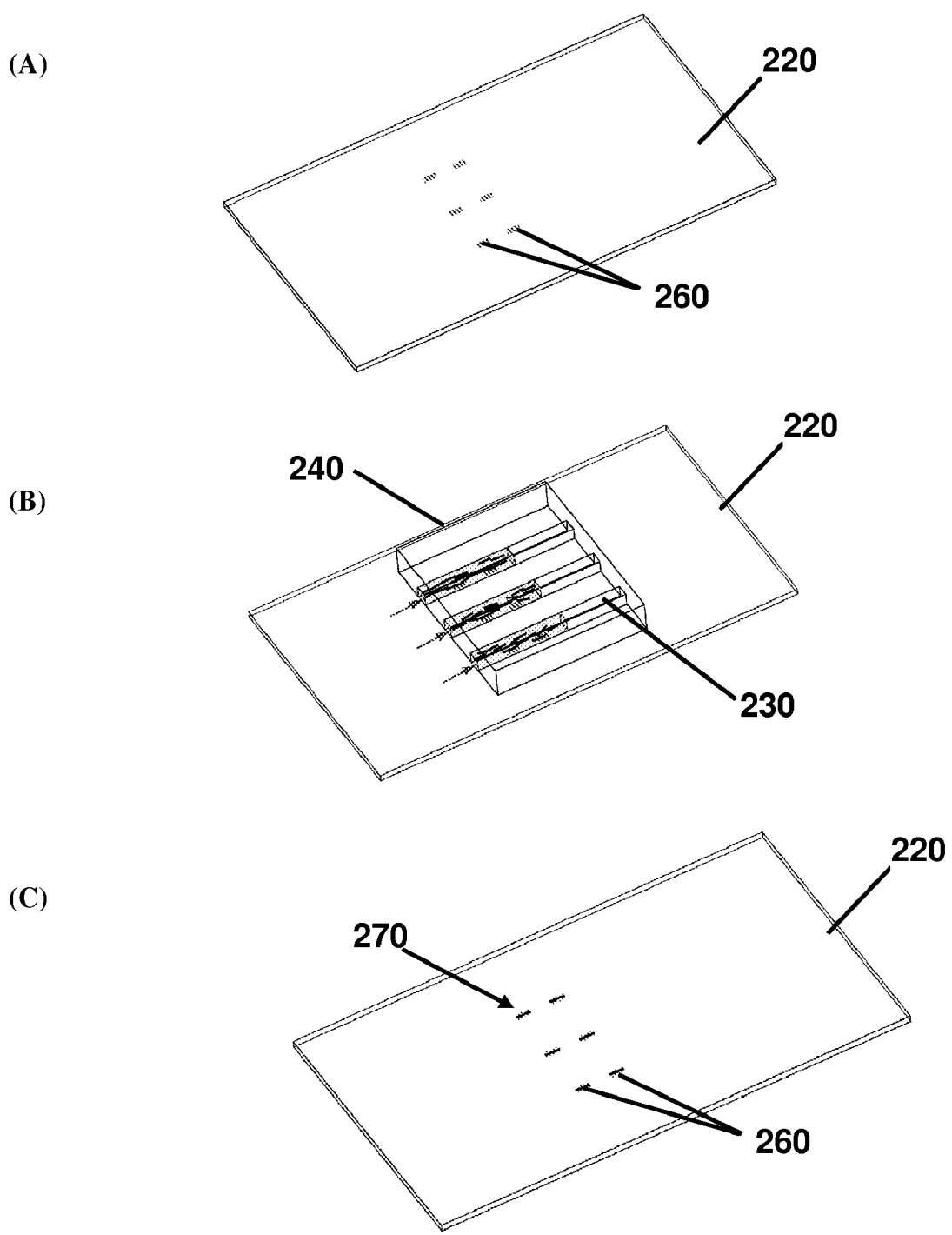
FIG. 7 illustrates site specific deposition of nanotubes from an exfoliated nanotube solution according to an embodiment of the invention.

Referring now to FIG. 7, precision placement of nanotubes in specific locations is advantageous in the design of certain microelectronic devices and circuits. In embodiments, chemical etching, electron-beam lithography, ion-beam lithography, high-resolution photolithography, nanoimprint lithography or other methods can be used to alter a support structure or substrate 220 to create a nanotube receptor 260. In certain embodiments the substrate is altered to create at least one receptor 260 for containing at least one nanotube. The receptor 260 may be a trough, a channel, slot or a binding site as known to one skilled in the art. The nanotube receptor 260 may be oriented in any direction, or configuration as known to one skilled in the art. A plurality of nanotube receptors 260 may be created on the surface of a substrate. Further, the plurality of receptors 260 may comprise a complex pattern. In certain embodiments, the receptors 260 denote a circuit or other pathway for electrical transmission.

The exfoliated nanotube solution is introduced over the receptor 260 by utilizing a removable template 240 as illustrated in FIG. 7B. The removable template 240 is constructed to include microfluidic channels or microchannels 230. Without being limited by theory, by injecting or forcing the solution through a microchannel 230, the nanotube aligns itself in the elongate direction of the vessel walls during transportation into the microchannel 230. The microchannel 230 is oriented parallel to the direction of the receptor 260 on the substrate 220. Once aligned at least one nanotube 270, the exfoliated nanotube solution is flowed over the receptor 260. Deposition of a nanotube may be in or on the receptor 260 on the substrate 220 as illustrated in FIG. 7C.

The substrate 220 may have a protective film. Without being limited by theory microelectronics, semiconductors and similar devices may include protective films over the substrate to prevent oxidation, degradation or other undesirable effects of exposure and contamination. The device can be treated to create a window, a hole or an aperture in a protective film covering a microelectronic device. In certain embodiments, the hole may be considered a nanotube trap, or a nanotube receptor.

Without being limited by theory, certain chemicals modify the surface of the nanotubes. Selective modification of the surface of nanotubes in suspension aid in creating bonding or interaction between the substrate and the nanotube. Once the substrate and the nanotube form bonds, the bonds function as anchors to hold the nanotube in place. In alternative embodiments the substrate surface and film can physically constrain the nanotube in place. In embodiments, the nanotube may be held in place by the flaps of film, nodes of substrate, or other structural characters. The physical interaction between the nanotube and the substrate function to hold the nanotube in place.

To further illustrate various illustrative embodiments of the present invention, the following examples are provided.

EXAMPLE

Materials and Methods
The ZrP nanoplatelets herein described were synthesized according to the following protocol:
Approach I (Refluxing Method).
A sample of 10.0 g $ZrOCl_2 \cdot 8H_2O$ was refluxed with 100.0 mL 3.0/6.0/9.0/12.0 M $H_3PO_4$ in a Pyrex glass flask at 100° C. for 24 hr. The final products were identified as ZrP(3M), ZrP(6M), ZrP(9M), and ZrP(12M), respectively. After the reaction, the products were washed and collected by centrifugation three times. Then, the ZrP was dried at 65° C. for 24 hr. The dried ZrP was ground with a mortar and pestle into fine powders.

Approach II (Hydrothermal Method).

A sample of 4.0 g ZrOCl2.8H2O was mixed with 40.0 mL 3.0/6.0/9.0/12.0 M H3PO4 and sealed into a Teflon-lined pressure vessel and heated at 200° C. for 5 hr and 24 hr, respectively. The final products were identified as ZrP(3M-200C-5h), ZrP(6M-200C-5h), ZrP(9M-200C-5h), ZrP(12M-200C-5h), and ZrP(3M-200C-24h), ZrP(6M-200C-24h), ZrP(9M-200C-24h), ZrP (12M-200C-24h), respectively. After the reaction, the products were treated by the same procedures as described in Approach I.

Approach III (HF Method).

A sample of 10.0 g $ZrOC_{l2}.8H_2O$ was mixed with 100.0 mL 3.0 M $H_3PO_4$ in a Teflon flask. Corresponding amounts of HF solution (5.0 M) were added to reach a molar ratio of $F^-/Zr^{4+}$=1, 2, 3, and 4. The mixture was refluxed within a Teflon flask coupled with a Teflon condenser at 100° C. for 24 hr. The final products were identified as ZrP(HF1), ZrP(HF2), ZrP(HF3), and ZrP(HF4), respectively. After the reaction, the products were treated by the same procedures as described in Approach I. However, the samples from this approach can be easily collected after they are dried, no grinding is necessary. The average diameter of the nanoplatelets used are around 100 nm.

Carbon nanotubes or CNTs (XD grade and HiPco SWNTs) were as obtained from Carbon Nanotechnologies, Inc. MWNTs were purchased from Aldrich. Tetra-n-butylammonium hydroxide ($TBA^+OH^-$) with a concentration of 1 mol/L in methanol was purchased from Aldrich.

Exfoliation of ZrP Nanoplatelets and Oxidation of CNT

ZrP nanoplatelets were fully exfoliated by $TBA^+OH^-$ in water with a molar ratio of ZrP:TBA=1:0.8. CNTs were first oxidized in a mixture of concentrated sulfuric acid and concentrated nitric acid with a volume ratio of 3:1 by ultrasonication in a sonicator bath (Branson 2510) for 3 hours. Then, de-ionized water was added to dilute the acids and the mixture was sonicated for another three hours. After the above process, the oxidized CNT were isolated by using a PVDF filter membrane (Millipore, 0.45 μm pore size) under vacuum. The CNT were washed several times with de-ionized water during filtration to remove the acid residue. The CNT collected were then re-dispersed in water by 3 hours of sonication.

Mixing of CNT and ZrP Nanoplatelets

Two aqueous solutions containing oxidized CNT and fully exfoliated ZrP nanoplatelets were directly mixed. The weight ratios of SWNTs to ZrP nanoplatelets were adjusted from 1:1 to 1:10. After mixing, the mixtures were agitated by magnetic stirring for 30 minutes and further homogenized by exposing to ultrasonication at 30~40° C. for 30 minutes. An aqueous solution containing only oxidized CNT was also prepared for comparison purposes.

CNT and CNT/ZrP powders were prepared by drying the aqueous mixtures in an oven at 100° C. for several hours until all water was removed. The dried CNT and hybrid powders were then redispersed in water, acetone, and toluene by mechanical shaking and ultrasonication.

Dispersion of SWNTs in Polymers

Polyvinyl alcohol (Fluka, Mw=61,000) was dissolved into the aqueous solution containing CNT and ZrP with weight ratio of 1:0 and 1:10. The final concentration of CNT is 0.2 wt-%. The mixtures were then cast onto glass slides and dried at 60° C. overnight to make polymer nanocomposite films.

The redispersed CNT/ZrP with weight ratio of 1:5 in acetone were mixed with epoxy monomer (EPIKOTE™ 862 resin) to achieve a finial CNT concentration of 0.1 wt-% in epoxy nanocomposites (denoted as epoxy/CNT/ZrP). The solvent was then removed via rotary evaporation in a water bath at 70° C. and curing agent (EPIKURE™ W) was added at a stoichiometric ratio. The mixture was then degassed and cast in a preheated glass mold and cured in an oven at 100° C. for 2 hours, followed by 2 hours of post-cure at 150° C. For comparison purposes, a neat epoxy sample (Neat Epoxy) and an epoxy sample with CNT (epoxy/CNT) of 0.1 wt-% CNT loading were also prepared.

Characterization

HR-TEM was performed using a JEOL 2010 high-resolution transmission electron microscope, operated at 200 kV. The solution samples were coated onto carbon grids and were then dried at room temperature. A Reichert-Jung Ultracut-E microtome was utilized to prepare thin sections of nanocomposites with thickness of 70-100 nm for HR-TEM imaging. X-ray diffraction (XRD) patterns were recorded using a Bruker D8 Advanced Powder X-ray Diffractometer with Cu-$K_\alpha$ incident radiation ($\lambda$=1.5418 Å).

X-ray photoelectron spectroscopy (XPS) data of the oxidized CNTs were obtained using a Kratos Axis Ultra X-ray photoelectron spectrometer. Non-monochromatic Mg $K_\alpha$ photons were used for the measurement. The atomic composition of the sample surface was calculated using the high resolution peak areas for the main core XPS line of each element in conjunction with the empirical sensitivity factors provided by the instrument manufacturer and the application of a Shirley-type background correction. The binding energy of the C(1s) was set at 284.5 eV as the reference for calibration. The absorption spectra of the CNTs in water were recorded on a Hitachi (model U-4100) UV-vis-NIR spectrophotometer. The reference spectrum for the measurements was de-ionized water.

Bundled CNTs

CNTs are formed as aggregated bundles. The aggregation of CNTs is mainly caused by van der Waals forces between tubes. The bundled CNTs are normally not dispersed in any solvent and will precipitate at the bottom of a solution. Slight oxidation of the CNT surface can improve their dispersion, but still shows poor suspension property. For illustration, TEM image of aggregated large CNT bundles in aqueous solution even after 3-hour of oxidation is shown in FIG. 1.

Dispersion and De-Roping of CNTs Using ZrP Nanoplatelets

Figure 8:
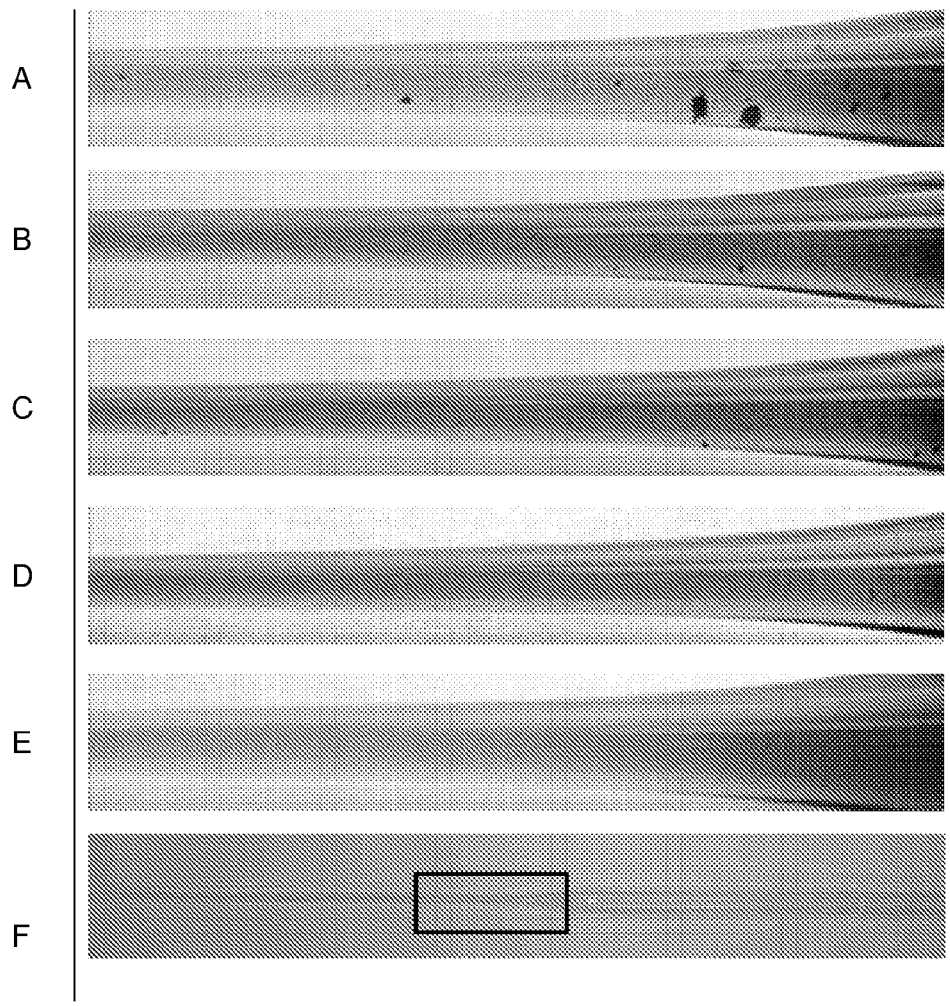
FIG. 8 is a photographic comparison of aqueous carbon nanotube dispersions.

The dispersion was performed by directly mixing ZrP nanoplatelets and SWNT in aqueous solution. FIG. 8 compares the visual appearance of the aqueous solutions containing SWNT and ZrP nanoplatelets with weight ratios 1:0 (A), 1:1 (B), 1:3 (C), 1:5 (D) and 1:10 (E). FIG. 8F demonstrates the portion of a glass pipet the solution was contained in for the comparison photos. The concentration of SWNT in all cases is 0.017 wt %. As the ZrP nanoplatelet concentration increases, the homogeneity of the solution increases. Particulate aggregates of oxidized nanotubes are dispersed.

After adding ZrP nanoplatelets, the aqueous CNT dispersion becomes dramatically improved in homogeneity of suspension color and stability. The higher the weight ratio of ZrP nanoplatelets to CNTs, the better the dispersion of CNT is in water. The solutions become homogeneous with presence of some small CNT particles when the mixing ratios of CNT/ZrP nanoplatelets are 1:1 (B) and 1:3 (C). Upon increasing the weight ratios to 1:5 (D) and 1:10 (E), the solutions become completely homogeneous without any visible CNT aggregates.

Figure 9:
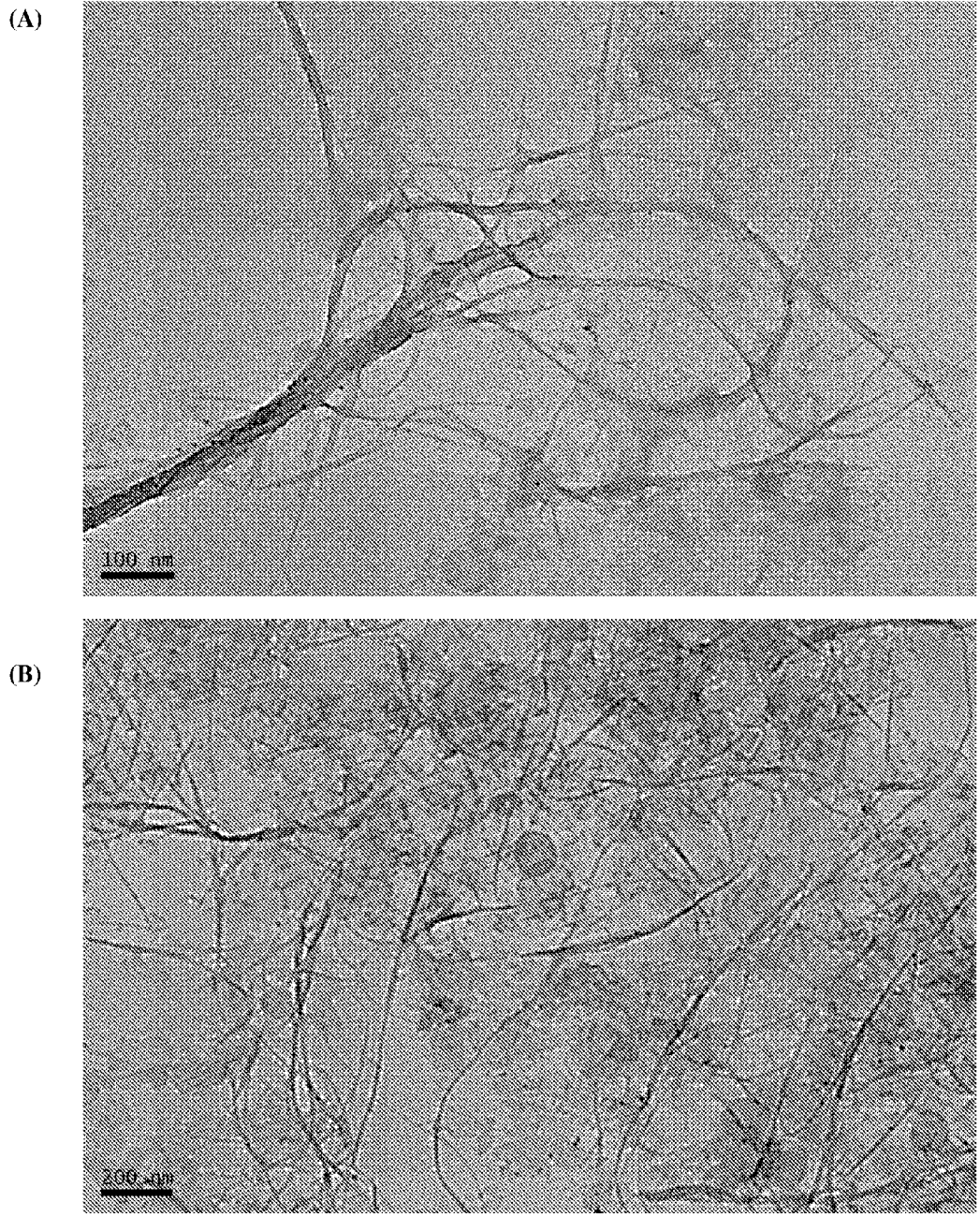
FIG. 9 is a series of transmission electron micrographs illustrating the dispersion of carbon nanotubes with nanoplatelets.
Figure 9:
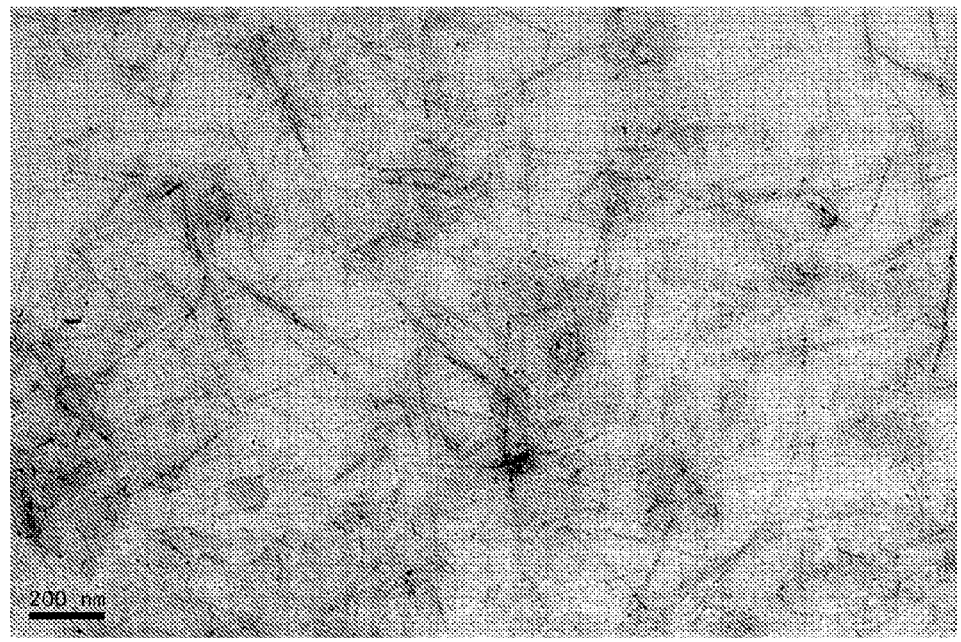

FIG. 9 shows TEM images of CNT/ZrP nanoplatelets with different weight ratios. When the weight ratio of SWNT to ZrP nanoplatelets is 1:1, both individual SWNT and SWNT bundles are found, as shown in FIG. 9A, indicating that a small amount of platelet-like structure can partially de-bundle the CNT. When the weight ratio of CNT/ZrP nanoplatelets increases to 1:3, CNT bundles become significantly de-roped into individual tubes with a diameter of around 1 nm, and all individual tubes are straight and attached to the surrounding ZrP nanoplatelets as shown in FIG. 9B. Upon increasing the CNT/ZrP ratio to 1:5, as observed in TEM image such as FIG. 9C, CNT bundles appear to have fully de-roped into individual tubes that are straight.

Figure 10:
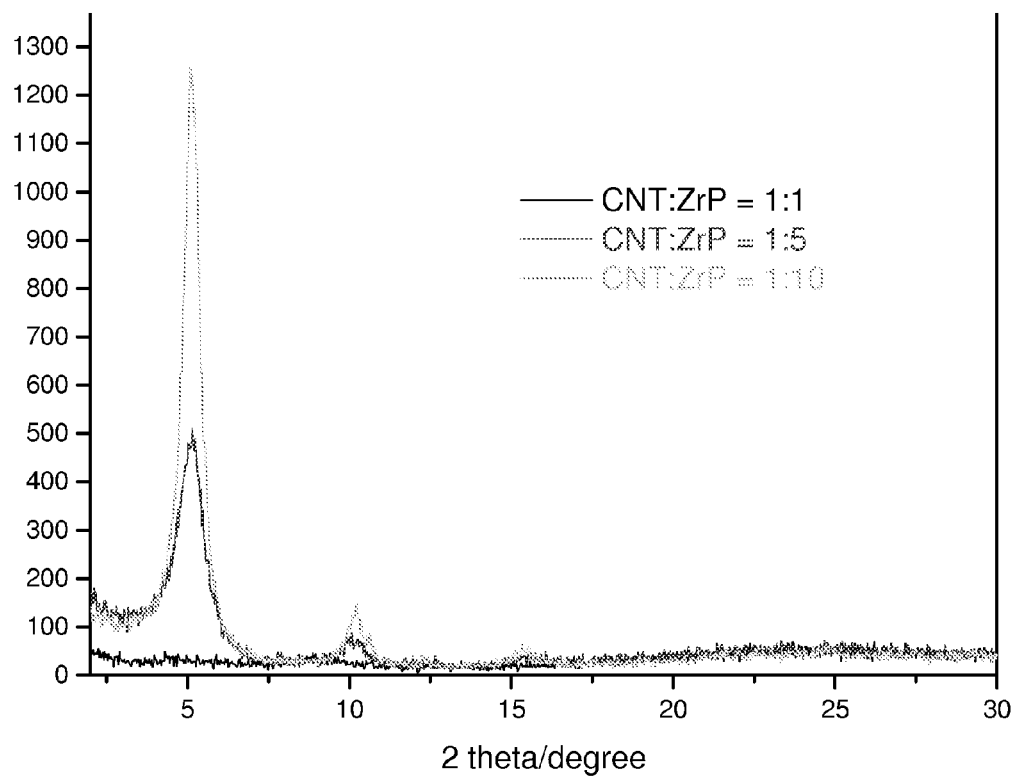
FIG. 10 is a graph of the X-ray diffraction pattern on carbon nanotube/nanoplatelet nanocomposite in a weight ratio dependent intensity signal.

It should be noted that for FIG. 9, intercalated ZrP nanoplatelets are also observed (i.e., the dark plate-like structure), while in the case of CNT/ZrP=1:1, shown in FIG. 9A, nanoplatelets are all randomly dispersed and exfoliated. The XRD patterns in FIG. 10 show that at the ratio of 1:5 and 1:10, strong diffraction peaks with a d-spacing of 17.6 Å are observed, indicating the presence of TBA-intercalated ZrP. However, when the ratio decreases to 1:1, no X-ray diffraction peak is found, demonstrating full exfoliation of the platelets.

RESULTS

Exfoliation of ZrP Nanoplatelets and Oxidation of CNTs

Pristine ZrP crystals have regular layered structure consisting of $Zr(HPO_4)_2$ platelets in stacks. The average dimension of the single layer used in this study is estimated to be around $100 \times 100 \times 1$ nm$^3$. The surface of each platelet is covered by hydroxyl functionality. In our previous work, complete exfoliation of stacked ZrP nanoplatelets in water was achieved by using bulky $TBA^+OH^-$ molecules. The intercalation-exfoliation mechanisms involve the acid-base reaction between surface hydroxyl groups and $TBA^+OH^-$. After exfoliation, each free platelet is covered by $TBA^+$. Due to the presence of intensive ionic charge characteristic, the TBA-exfoliated ZrP nanoplatelets are capable of retaining stable exfoliation in aqueous solution. The nanoplatelets exhibit specific two-dimensional geometry and high aspect ratio. Thin ZrP nanoplatelets with high ionic charges on the surface can be used as a novel inorganic dispersant.

Figure 11:
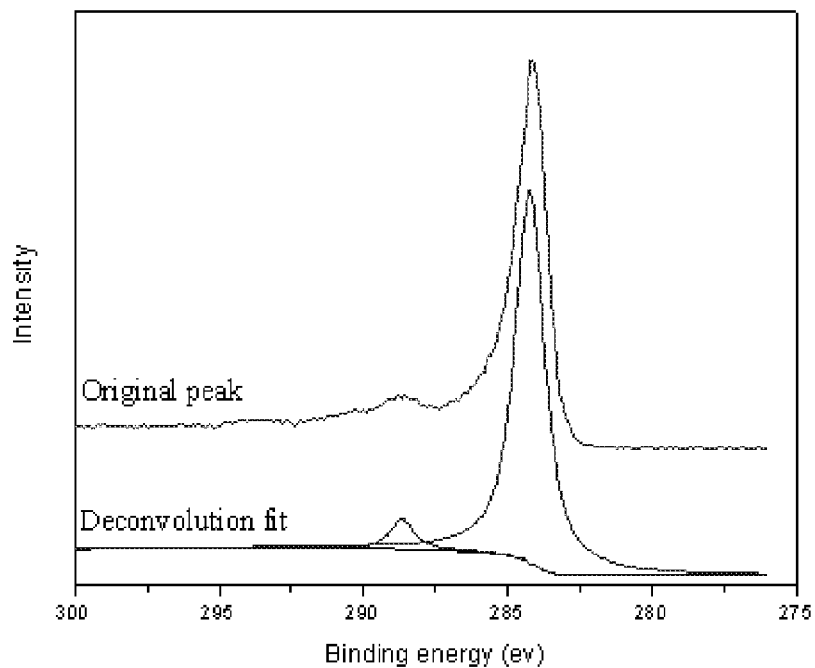
FIG. 11 shows graphs of the X-ray photoelectron spectroscopy (A) and the absorption spectrum data (B) for oxidized CNTs.
Figure 11:
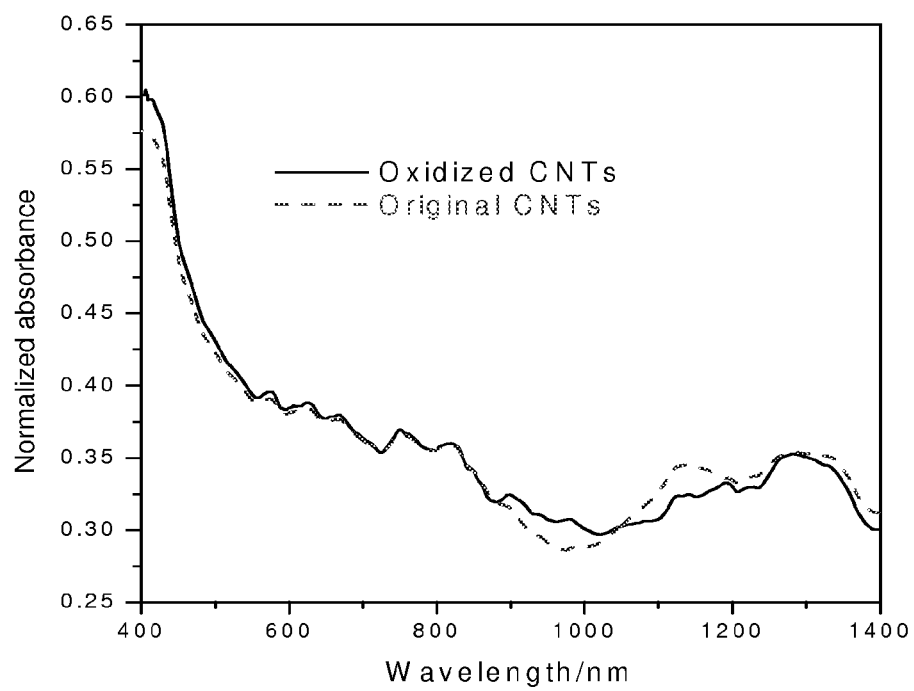

It has been shown that short time exposure of oxidizing acids at room temperature mainly opens the ends of CNTs into negatively charged carboxylic groups, and only causes minor oxidation of the CNT side walls. Therefore, the oxidation of CNTs performed in this study (i.e., room temperature for 3 hours) should not significantly damage CNT side-walls. Thus, CNT physical properties should be retained. X-Ray Photoelectron Spectroscopy (XPS) revealed that after such oxidation treatment, only less than 4% of carbon atoms were oxidized as illustrated in FIG. 11A. Considering that the original CNTs have an oxidation level of ~2% after synthesis, the oxidization treatment performed here only introduces a small amount of additional oxidative groups on the nanotubes surfaces. Furthermore, optical absorption spectra in FIG. 11B shows the original and oxidized CNTs are similar, indicating that the electronic structure of the tube side walls is retained after the oxidizing treatment CNT/ZrP Nanocomposites and Re-Dispersion of CNTs The XRD patterns and TEM images indicate that after drying the aqueous systems, the de-roped CNT and ZrP nanoplatelets actually interact with each other and form a new material, CNT/ZrP nanocomposites. The dried nanocomposite powders can also be re-dispersed into solvents through ultrasonication.

Figure 12:
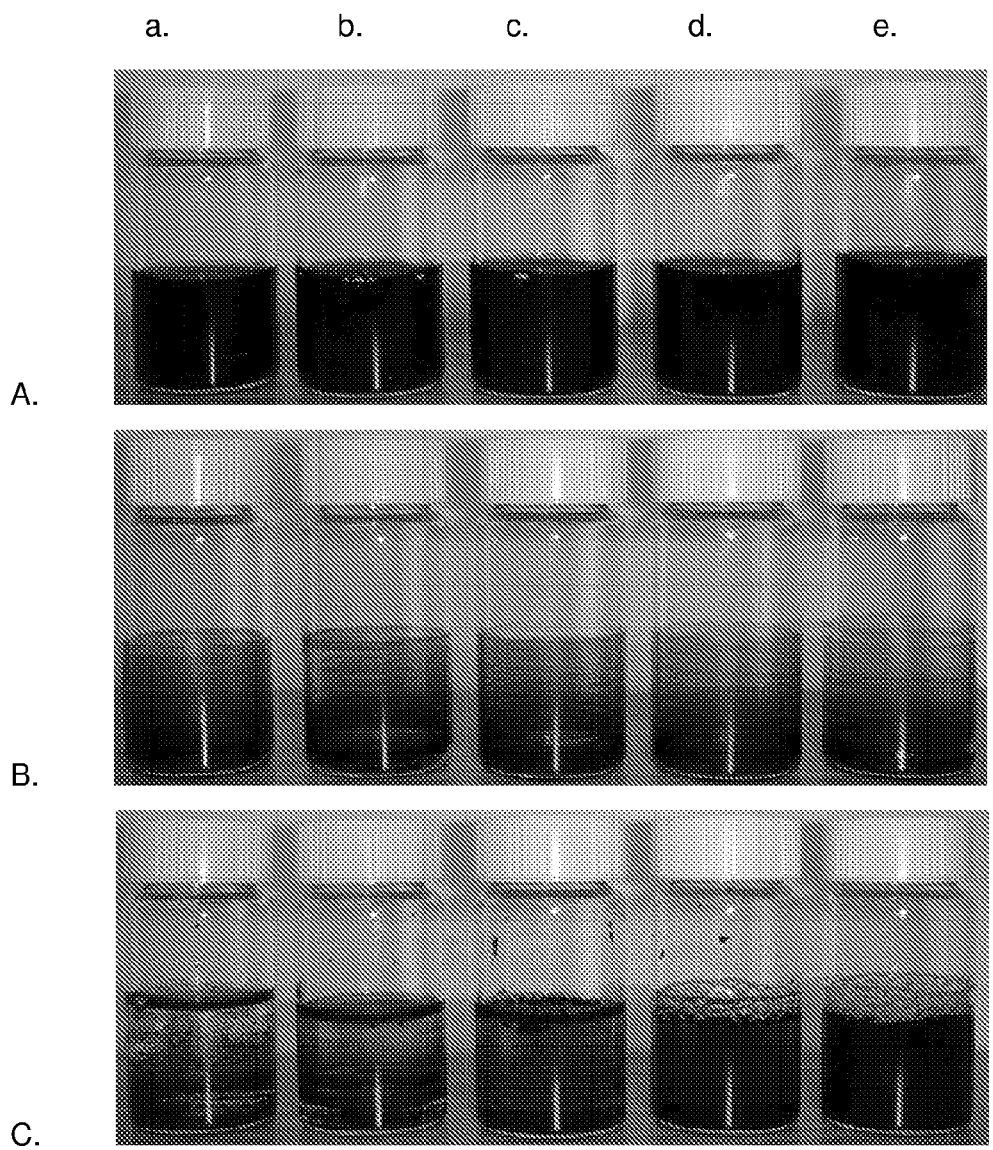
FIG. 12 is a series of images of (A) aqueous dispersion, (B) dried powders, and (C) aqueous re-dispersion of the nanocomposite at different nanotube to nanoplatelet weight ratios according to embodiments of the disclosed invention.

FIG. 12 shows the visual images of the aqueous solutions containing CNT and ZrP nanoplatelets at different weight ratios of 1:0, 1:1, 1:3, 1:5, and 1:10, the corresponding dried CNT/ZrP hybrids, and the corresponding redispersed CNT/ZrP hybrids in water by mechanical shaking. After drying in an oven at 100° C., aqueous solutions containing CNT and a mixture of CNT and ZrP nanoplatelets form as dry powders. After adding water and hand-shaking, an increase in dispersion of CNT is observed as increasing quantities of ZrP nanoplatelets are added. In the case of the aqueous solution containing only CNT, large black aggregates are observed, indicating the high hydrophobicity of CNT after drying and re-dispersion. In the case of CNT/ZrP nanocomposites, all the samples show progressively better dispersion than the system containing only CNT, but only for the system containing a weight ratio of CNT:ZrP=1:10 can homogeneous dispersion of CNT be observed. After sonication, the dispersion improves.

Figure 13:
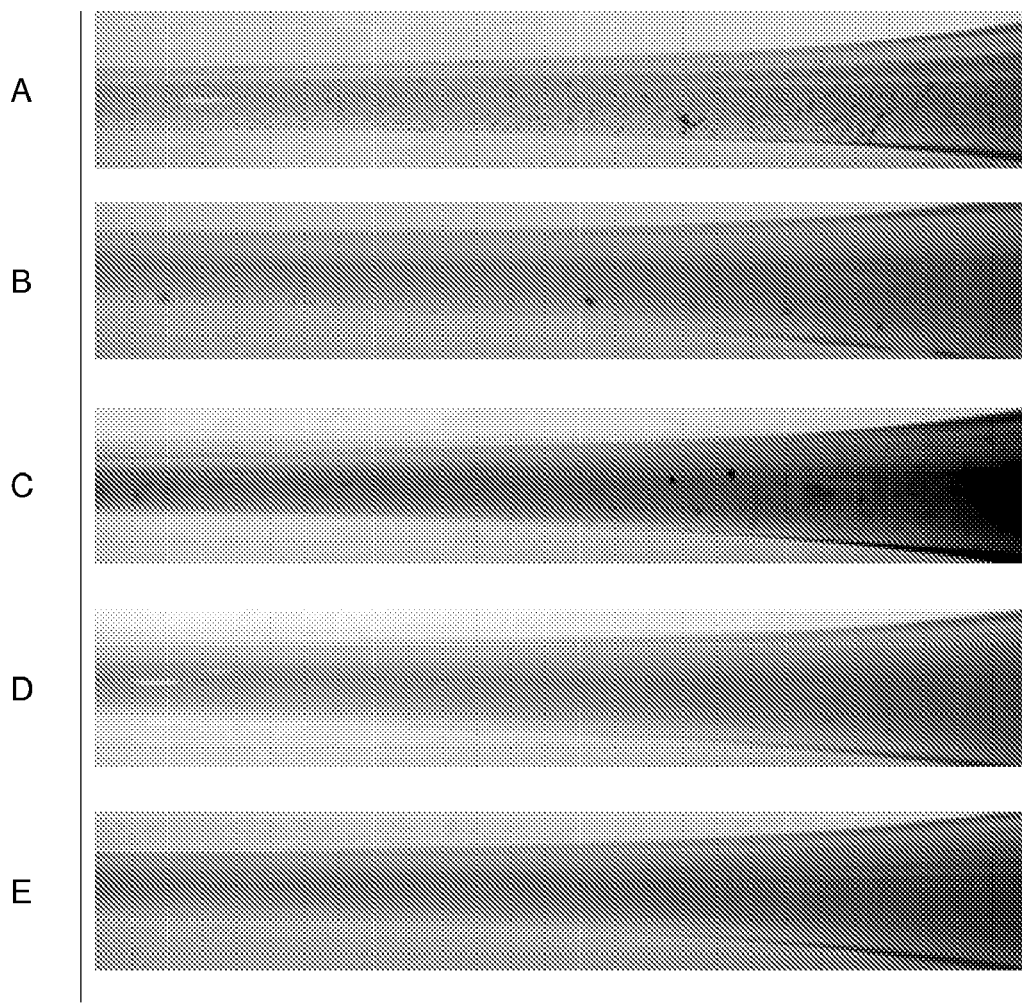
FIG. 13 is a series of photographs of the aqueous re-dispersions of carbon nanotubes and nanoplatelets at different nanotube to nanoplatelet weight ratios according to embodiments of the disclosed invention.

FIG. 13 shows visual images of the solution after re-dispersion through sonication. CNT particles are still seen if no ZrP nanoplatelets are added as illustrated in FIG. 13A. When the weight ratios of CNT to ZrP nanoplatelets are 1:1 (FIG. 13B) and 1:3 (FIG. 13C), only a few CNT particles can be seen after sonication. When the weight ratios increase to 1:5 (FIG. 13D) and 1:10 (FIG. 13E), the CNT in water are homogeneously re-dispersed in water. It appears that the effectiveness of CNT re-dispersion in water is a function of ZrP concentration. All the samples still contain CNT in a concentration of 0.017 wt-%.

Figure 14:
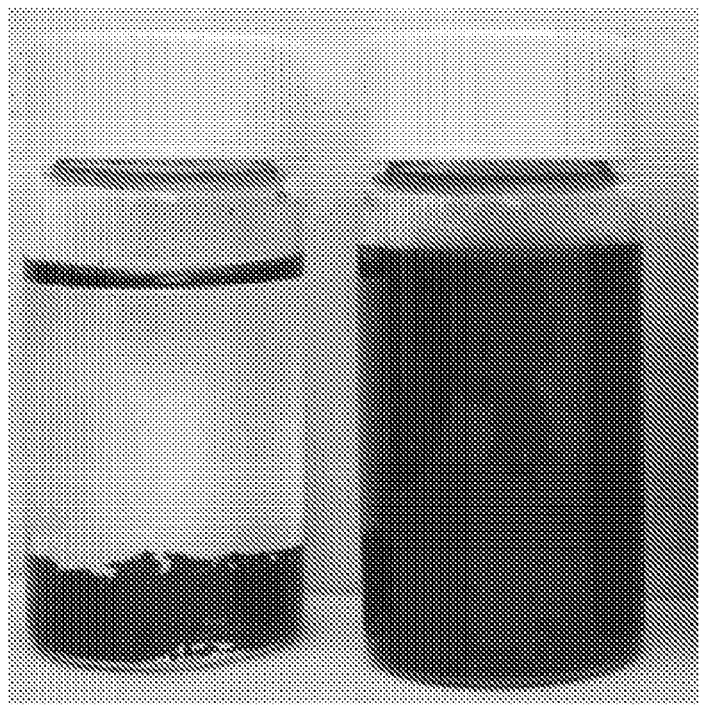
FIG. 14 photographically illustrates the five month stability of single walled carbon nanotubes in aqueous solution without nanoplatelets, with nanoplatelets and multi-walled carbon nanotubes with nanoplatelets.
Figure 14:
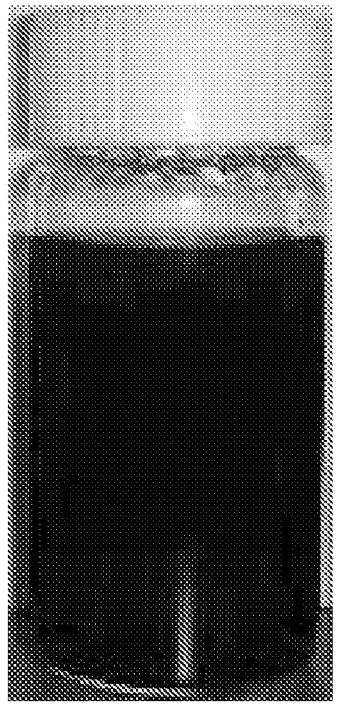

It should be noted that the aqueous solutions prepared are stable and even after 5 months of storage and the concentration of SWNTs in water can reach as high as 1000 ppm. FIG. 14A shows the visual images of oxidized SWNTs and CNTs/ZrP with the weight ratio of 1:5 in water after 5-month dispersion. The SWNTs alone form large aggregates and precipitate, while the SWNTs with ZrP maintain a homogeneous dispersion.

Figure 15:
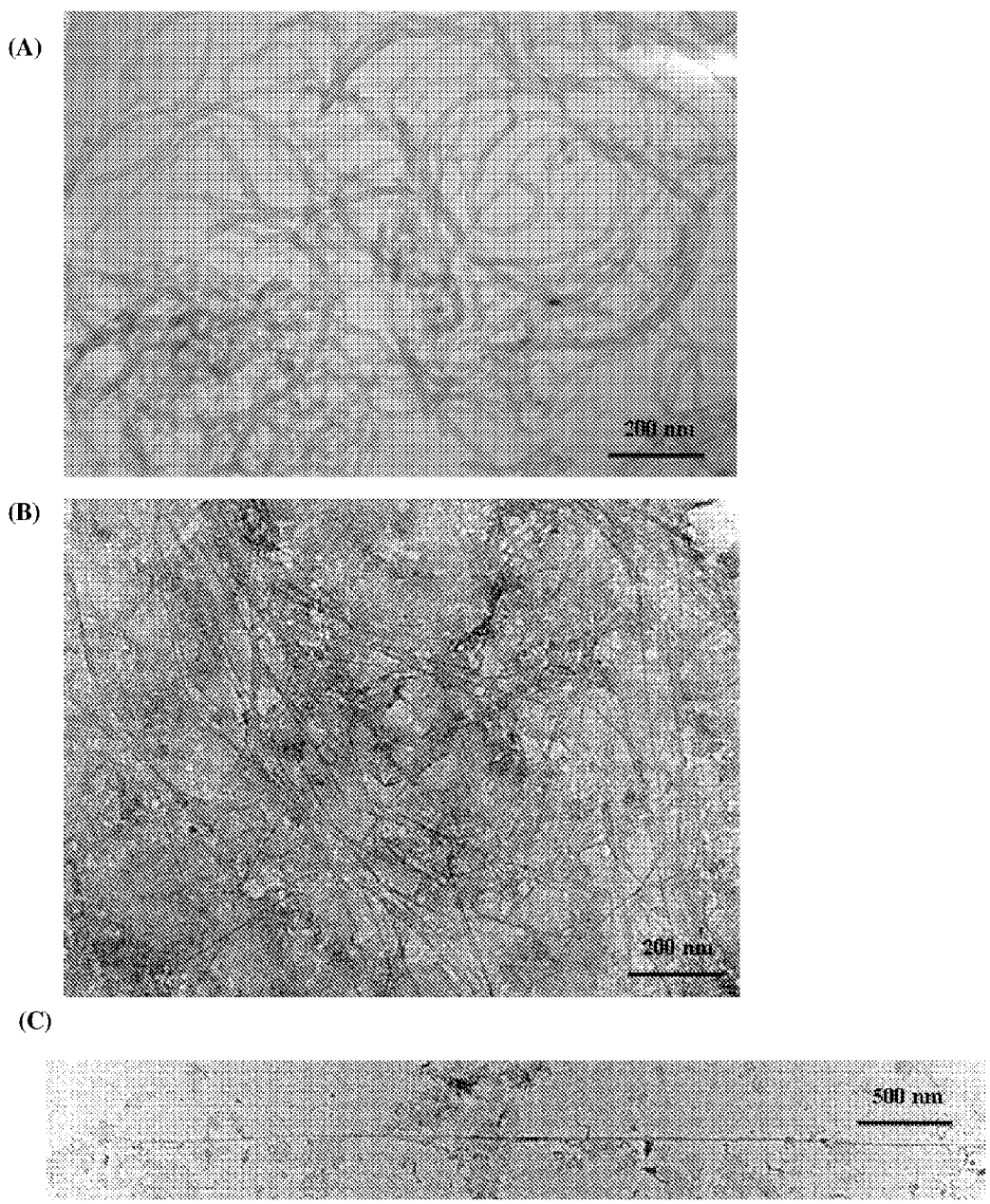
FIG. 15 is a transmission electron micrograph series of MWNTs dispersed according to an embodiment of the invention.

The same approach can also be applied to disperse MWNTs. The image in FIG. 14B is an aqueous solution containing dispersed MWNTs with ZrP after 5 months of dispersion. FIG. 15 illustrates the dispersion of MWNTs via exfoliated ZrP nanoplatelets. Before dispersion, in FIG. 15A, MWNTs are long but curved and highly entangled. However, after mixing with exfoliated ZrP nanoplatelets, MWNTs are disentangled and well dispersed as shown in FIG. 15B. TEM images in FIG. 15A of the original MWNTs, and FIG. 15B of the MWNTs dispersed via exfoliated ZrP nanoplatelets. The TEM image in FIG. 15C shows a single straight MWNT with around 3 μm in length.

The concentration of MWNTs in the solution can also reach as high as 1000 ppm with a stable dispersion. It should be noted that after dispersion, MWNTs become straight, indicating that our dispersion approach does not cause significant damage the side walls of CNTs. This also ensures that through our approach the dispersed CNTs preserve their superior physical and mechanical properties.

Figure 16:
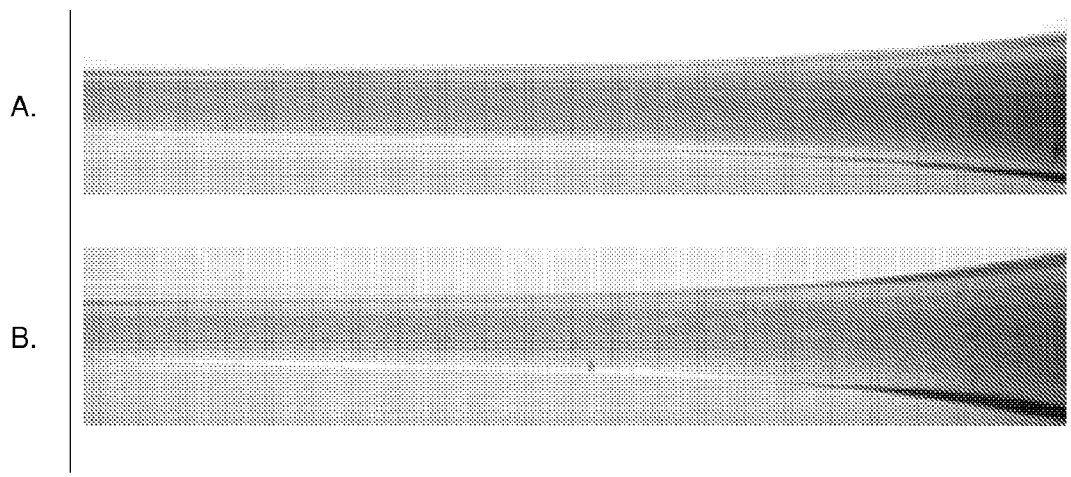
FIG. 16 illustrates carbon nanotube re-dispersion in acetone (A) and toluene (B) according to embodiments of the disclosed invention.

The dried CNT/ZrP nanocomposites can also be re-dispersed into non-aqueous solutions. FIG. 16 shows visual images of the re-dispersed CNT/ZrP nanocomposites having a weight ratio of 1:10 in acetone (A) and toluene (B) after sonication. It is evident that CNT are homogeneously dispersed in both solvents.

Dispersion of CNTs in Polymers and Clays

Figure 17:
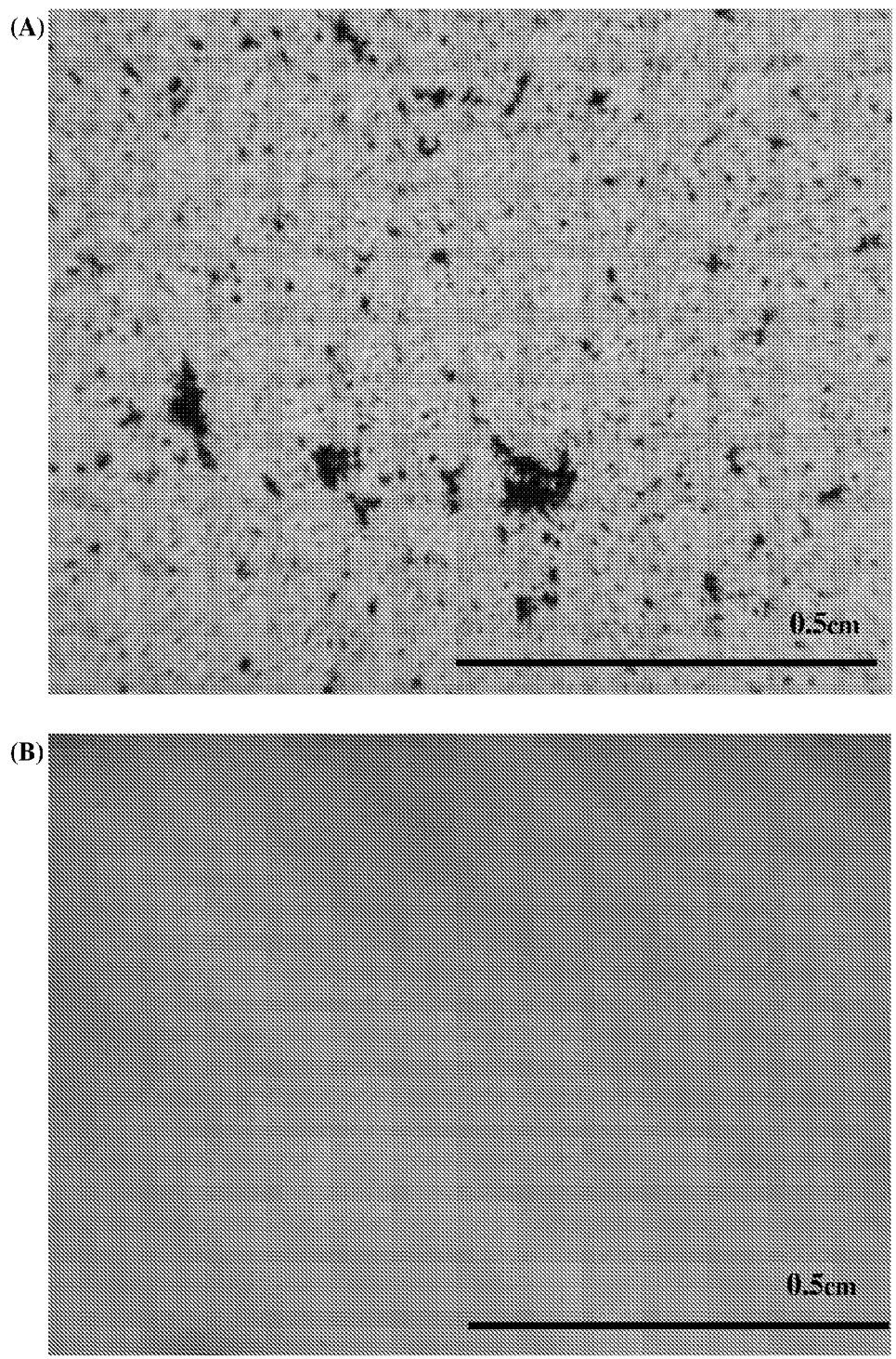
FIG. 17 is a transmission electron micrograph comparison of un-dispersed (A) and dispersed (B) nanotubes in polyvinyl alcohol according to embodiments of the disclosed invention.

FIG. 17 shows the visual images of PVA/CNT and PVA/CNT/ZrP films for comparison of homogeneity of dispersion. Without addition of ZrP, CNT form large aggregates in PVA as illustrated in FIG. 17A. After adding ZrP, the dispersion becomes homogeneous and the aggregates are indistinguishable from the polymer as illustrated in FIG. 17B.

Figure 18A:
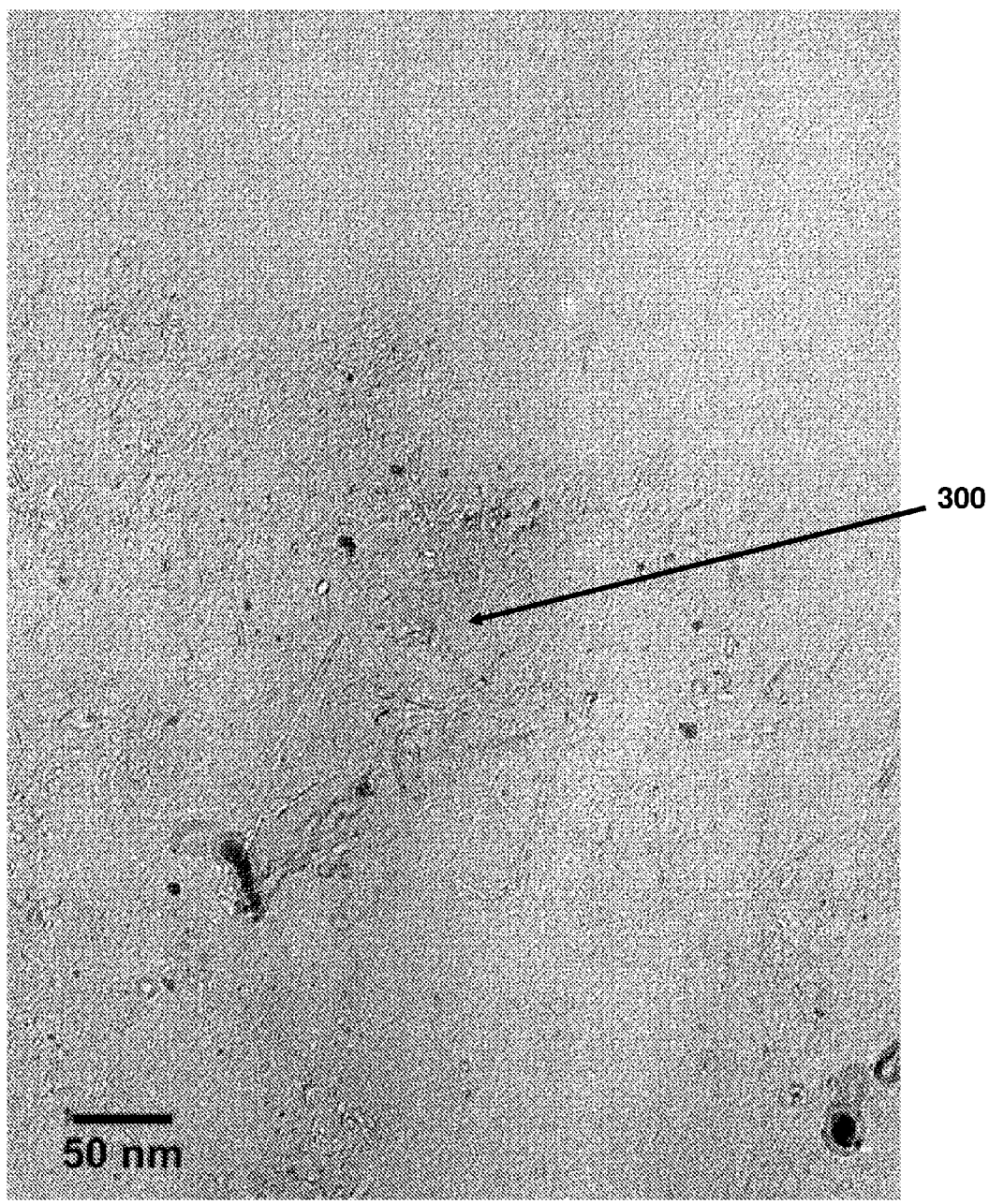
FIG. 18 is a transmission electron micrograph comparison of bundled (A) and dispersed (B) nanotubes in epoxy.
Figure 18B:
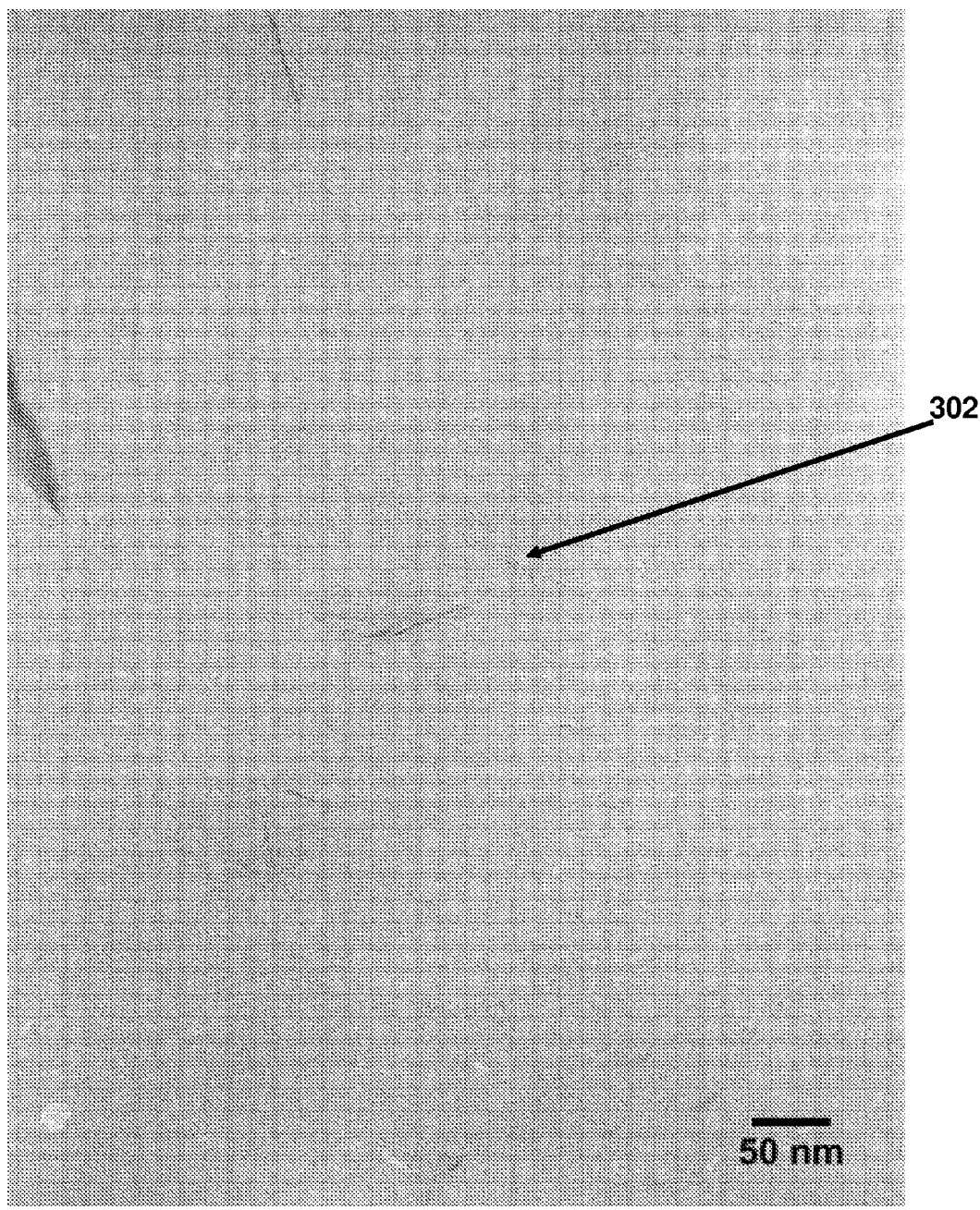

FIGS. 18A and 18B are high magnification comparison TEM images of epoxy/CNT (FIG. 18A) and epoxy/CNT/ZrP nanocomposites (FIG. 18B). As illustrated in FIG. 18A without the addition of ZrP, CNT bundles are curved, entangled with each other and form large aggregates 300 in epoxy. However, as illustrated in the presence of exfoliated ZrP nanoplatelets, highly de-roped CNT tubes are well dispersed in epoxy. They cannot be easily observed in the thin section of only 70-100 nm in thickness through TEM. Straight de-roped tubes 302 with a diameter of only around 1 nm are seen in epoxy.

Figure 19:
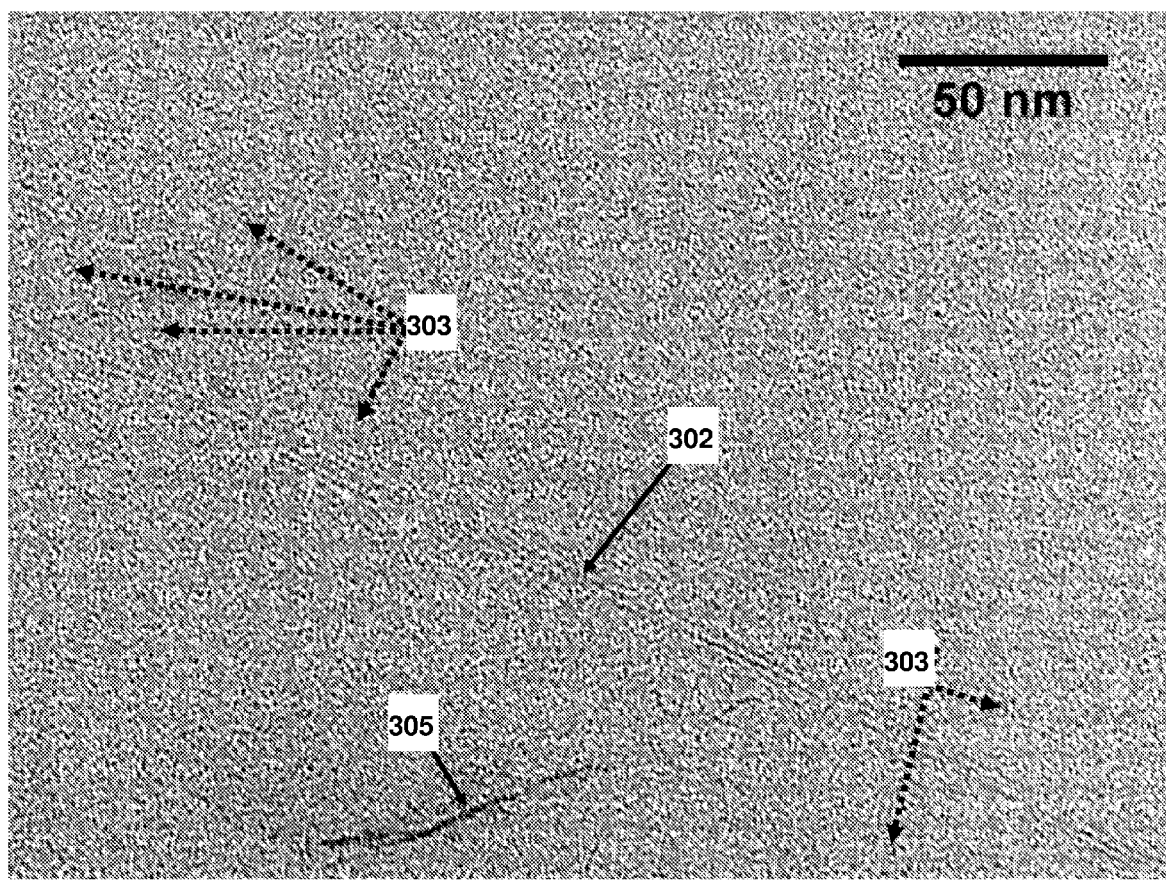
FIG. 19 is a high magnification transmission electron micrograph showing dispersed carbon nanotubes in epoxy with visible cross sections and lateral views according to embodiments of the disclosed invention.

At a higher magnification, as shown in FIG. 19, the individual de-roped tubes can be observed laterally 302 and as tube cross-sections 303 with diameter of around 1 nm. The TEM evidence demonstrates that CNT have been highly de-roped and well dispersed in epoxy. The nanoplatelets 305 are randomly exfoliated in epoxy.

The de-roped and dispersed CNTs were directly mixed with clay in an aqueous solution. The concentrations of CNTs in the clay hybrids were controlled from 0.01 wt % to 0.5 wt %. After mixing, the mixtures were agitated by magnetic stirring for 30 minutes and further homogenized by exposing to ultrasonication at room temperature for 2~3 hours. Subsequently, the hybrid solution was cast on a Petri-dish and dried in an oven at 50° C. for a day and inorganic films were obtained.

Figure 20:
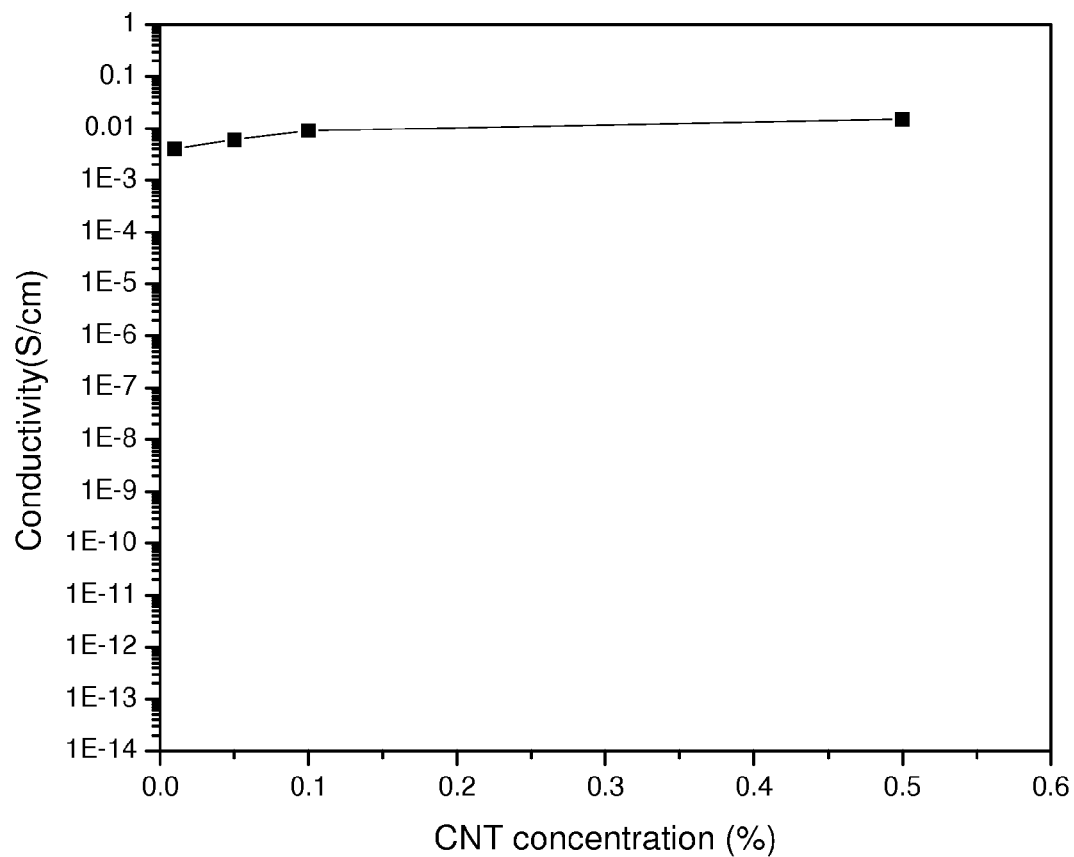
FIG. 20 is a conductivity verses SWNT wt % analysis curve in inorganic clay according to an embodiment of the invention.

FIG. 20 shows the conductivities of the inorganic hybrid films with different CNT concentrations corresponding to Table 1. When the concentration of CNTs is 0.01 wt. %, the conductivity is approximately 0.004 S/cm, indicating an electrical percolation at a low CNT loading.

TABLE 1

| CNT concentration (wt %) | Conductivity (S/cm) |
|---|---|
| 0.01 | $4.1 \times 10^{-3}$ |
| 0.05 | $6.4 \times 10^{-3}$ |
| 0.1 | $9.2 \times 10^{-3}$ |
| 0.5 | $1.5 \times 10^{-2}$ |

Figure 21:
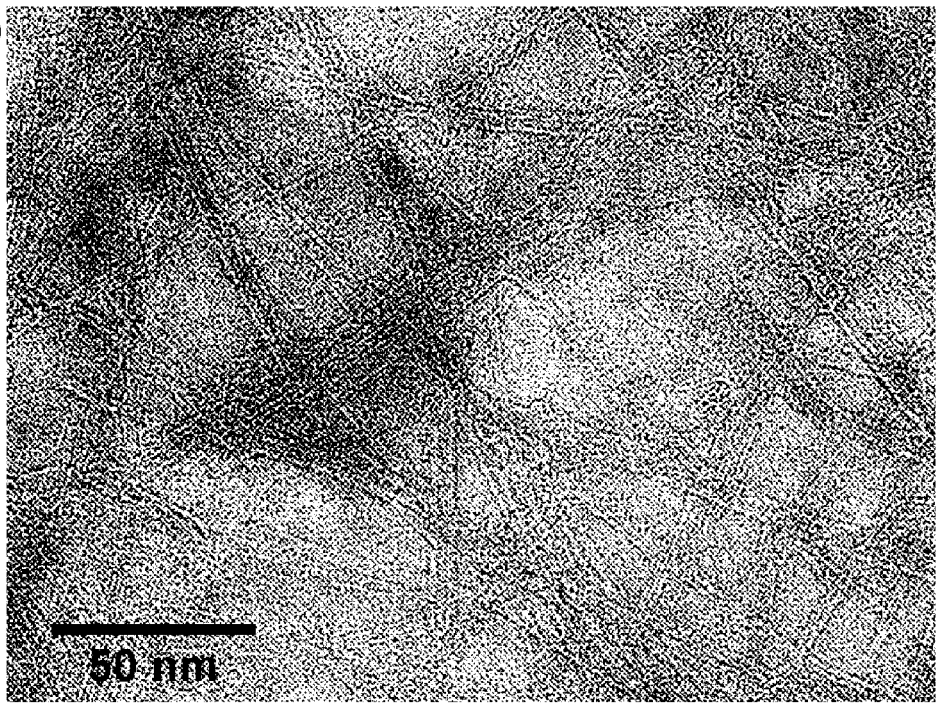
FIG. 21 is a transmission electron micrograph of SWNT matrix in inorganic clay and a photograph illustrating the increased flexibility.
Figure 21:
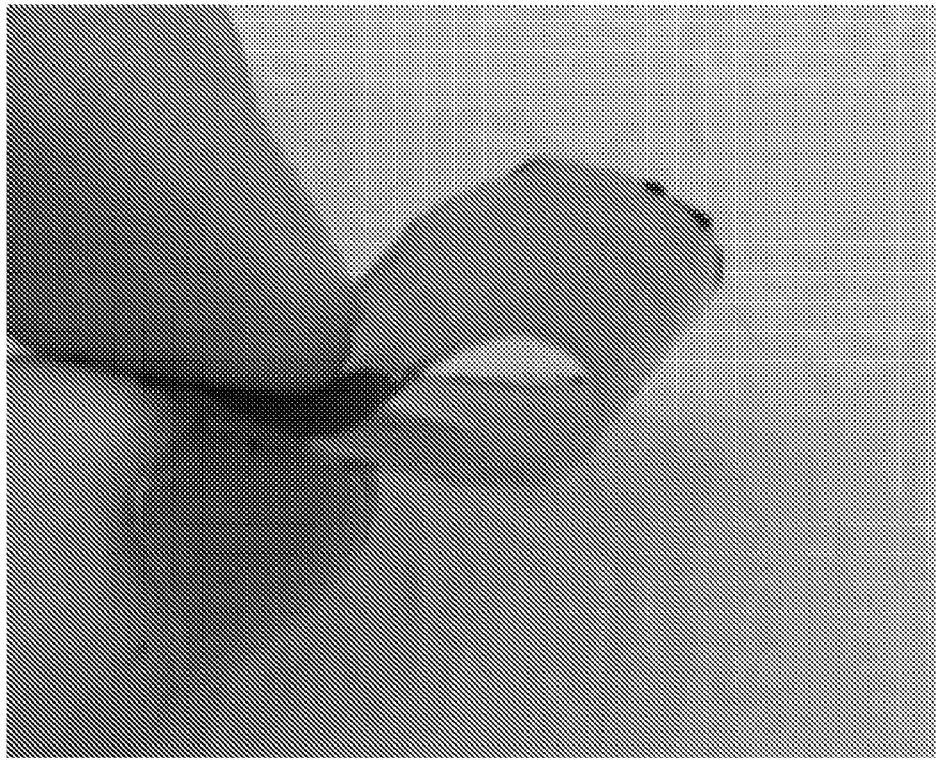

As shown in FIG. 21A de-roped CNTs form highly interconnected network at the concentration of 0.5 wt. %, which corresponds to the observed conductivity improvements of the hybrid inorganic films. FIG. 21B illustrates the inorganic hybrid films exhibit great flexiblity compared to the pure clay films due to the presence of well-dispersed CNTs.

Separation and Stabilization of CNTs from CNT/ZrP Nanocomposite

Figure 22:
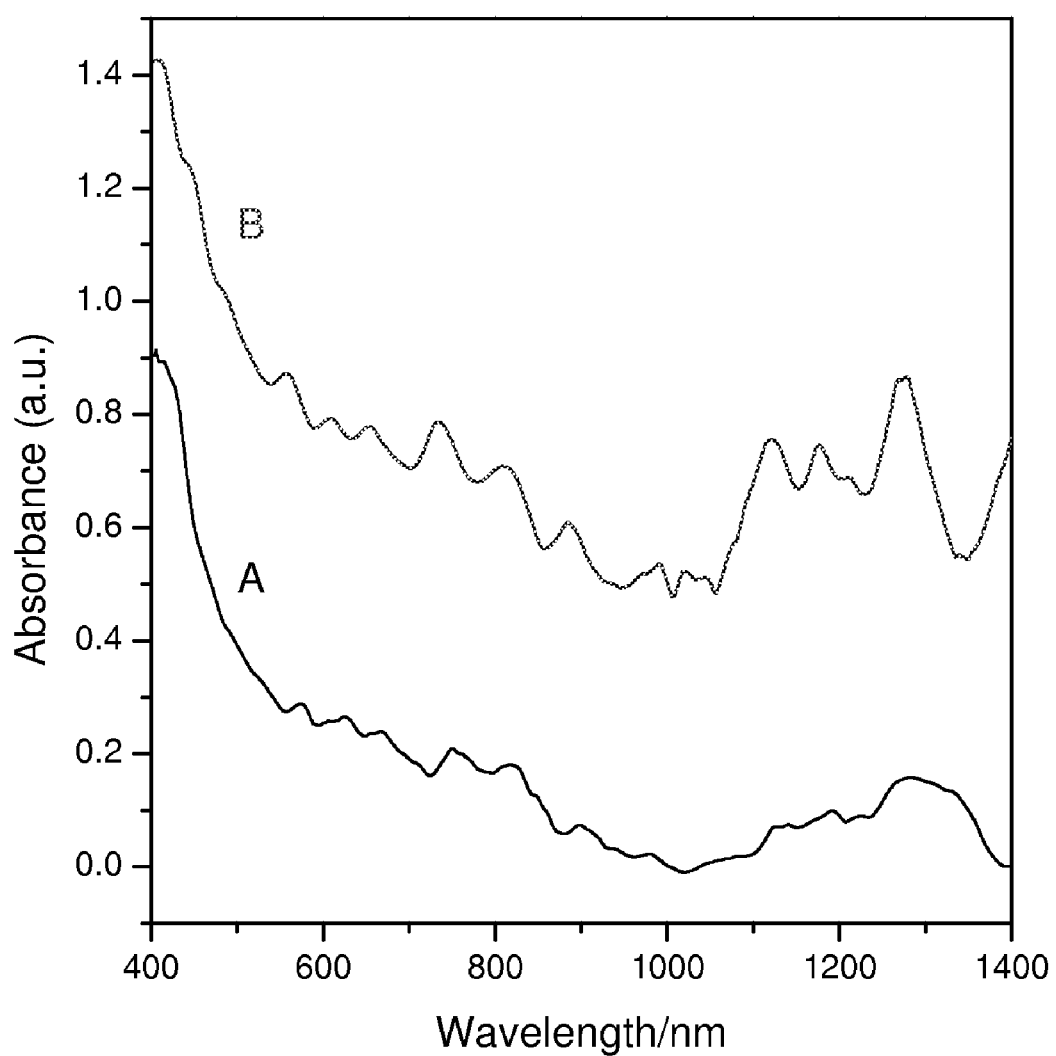
FIG. 22 is an optical absorption spectrum comparing oxidized CNTs (A) and dispersed CNTs (B).

Upon exfoliation of CNTs in the solution, the ZrP and CNT can be separated by altering the ionic strength of the aqueous solution. A complete coagulation of the de-roped CNTs is observed after 0.01 mol/L KCl is added into the aqueous solution. Afterwards, centrifugation was used to collect the coagulated carbon nanotubes without sedimentation of the exfoliated ZrP nanoplatelets. After being washed with de-ionized water twice, the CNTs were easily redispersed into 1 wt. % of sodium dodecyl sulfate (SDS) aqueous solution at a neutral pH value. The supernatant was also dried and weighed, it was confirmed that virtually all the nanoplatelets were removed from the nanotubes. FIG. 22 shows the optical absorption spectra of oxidized-CNTs with SDS (A) and the SDS-stabilized de-roped CNTs separated from the nanoplatelets in water (B). The pronounced absorbance of the blue-shifted peaks observed from the pure de-roped CNTs strongly suggest the dominant presence of exfoliated CNT because any presence of bundles or aggregation would have caused red-shifting and broadening of the absorption spectrum. The absorption spectra also demonstrate that the electronic structures on the sidewalls of CNTs have been preserved. Polyvinyl pyrrolidone (PVP) and piperidine were also used to successfully disperse and stabilize the de-roped CNTs after removal of nanoplatelets. It is also worth noting that, besides the surfactants used above, many other types of surfactants, polymers, proteins, and DNAs, which have been utilized to stabilize and disperse carbon nanotubes reported in the literature, can also be applied to achieve individually dispersed nanotubes prepared through the current approach for various applications.

Conductivity of Dispersed Carbon Nanotubes

Table 2 below demonstrates the wt-% dependent conductivity of dispersed single walled carbon nanotubes.

TABLE 2

| Concentration of SWNT (wt-%) | Conductivity (S/m) |
|---|---|
| 0.01 | 0.45 |
| 0.1 | 0.79 |
| 0.5 | 1.33 |

The electrical properties of the deposited CNT stripes depend on the type of constituent CNTs. Highly conductive CNT stripes made of metallic SWNT or MWNT can be used for applications such as interconnects for microelectronics chips, or wire grids to render highly conductive surfaces on polymer composites for advanced applications. On the other hand, stripes made of dominantly semi-conducting CNTs can find attractive applications in nanoelectronics and sensors. One distinctive advantage of using semi-conducting CNT stripes as active materials for solid-state devices, such as field-effect transistors and chemical sensors, is that multiple CNTs are organized in parallel in those devices. The parallel configuration can greatly reduce the total contact resistance, which is one of the major factors that limit the usefulness of current CNT devices for real-world applications. Electronic devices based on parallel CNTs are gaining increasing attentions in recent years as a practical solution for high-frequency field-effect transistors for advanced communication applications. The semi-conducting CNT stripes also make it possible to fabricate integrated circuits based on CNTs. Multiple CNT stripes can be deposited in an array on a substrate. Using conventional microelectronic fabrication processes, the stripes can be cut into segments on which transistors can be made. Integrated circuits can then be constructed by wiring those transistors by metal interconnects. The ability to deposit semi-conducting CNT stripes may lead to a significant advancement in developing CNT-based microelectronic devices and circuits.

CNTs Separation and Enrichment Based on Conductivity Type

The electrical properties of the deposited CNT stripes depend on the type of constituent CNTs. Highly conductive CNT stripes made of metallic SWNT or MWNT can be used for applications such as interconnects for microelectronics chips, or wire grids to render highly conductive surfaces on polymer composites for advanced applications. On the other hand, stripes made of dominantly semi-conducting CNTs can find attractive applications in micro- and nanoelectronics and sensors.

Figure 23:
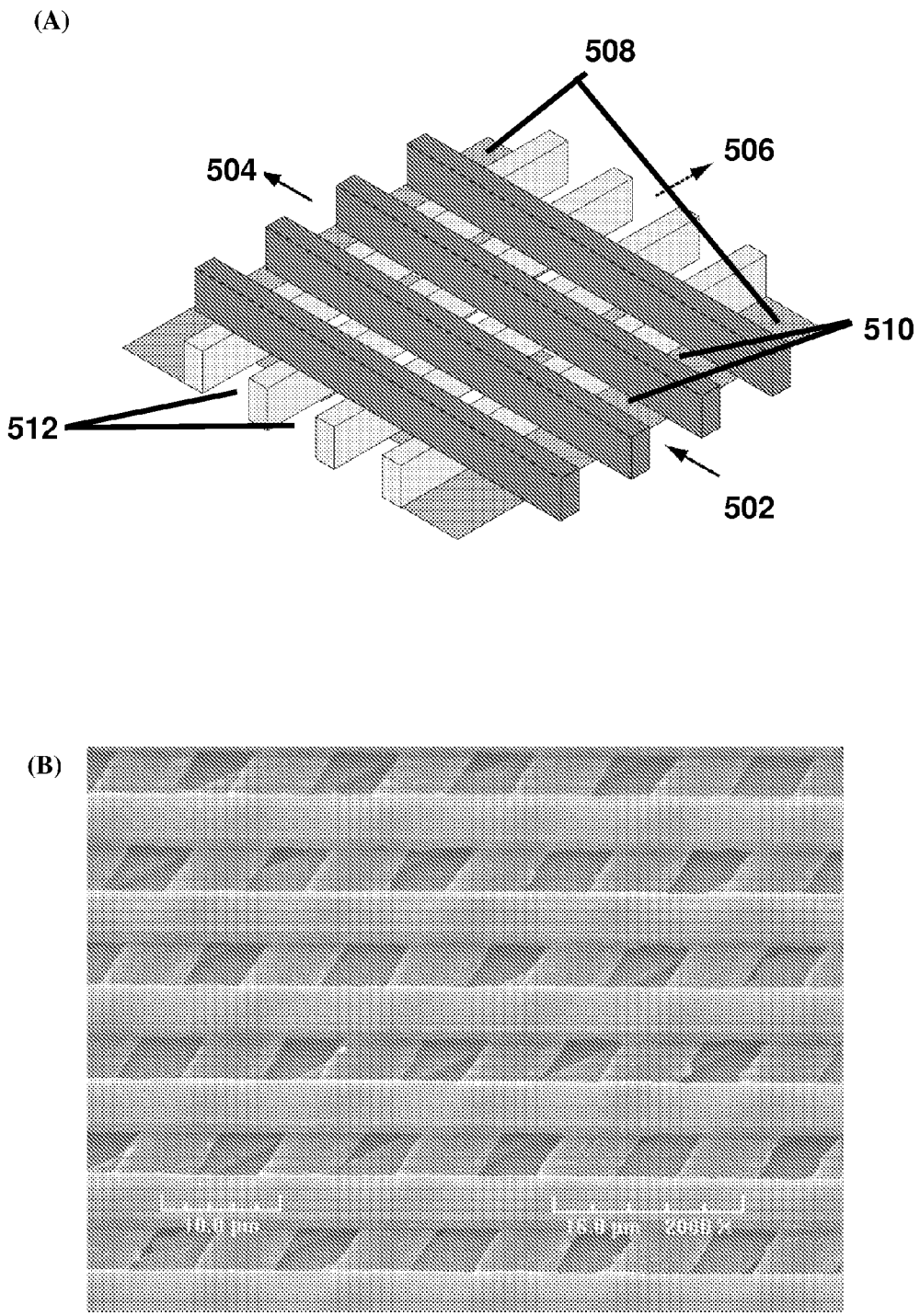
FIG. 23 is a schematic and a microphotograph of a two layer separation system for nanotubes.

The separation of semi-conducting and metallic CNTs in a suspension can be achieved by several approaches such as dielectrophoresis and precipitation of surfactant-wrapped metallic SWNTs. Combining advanced multilayer microfluidics with dielectrophoresis achieve efficient separation of CNT types with improved selectivity. The separation system comprises two-layer microfluidic channels and a bottom electrode array as illustrated in FIG. 23A. The semi-conducting and metallic CNT mixture suspension 502 flows slowly in top channels 510, and the dielectrophoretic force generated by the underlying electrodes 508 pulls metallic CNTs into the bottom channels 512, which can be collected by fluid flow in bottom channels 512. The remaining CNT suspension 504 in top channels will be enriched in semi-conducting tubes. The suspensions 504, 506 with purified CNTs can be used for CNT alignment and placement. Combining electrodes with microfluidic channels make dielectrophoresis more effective by enabling a larger actuating voltage and forcing CNTs in suspension to be in the vicinity of the electrodes. The separation can be done in a continuous fashion for bulk processing and multiple pass-through of the suspension can result in better separation. This is highly feasible due to recent progress in fabricating 3-D polymer multilayer structures illustrated in FIG. 23B.

One distinctive advantage of using semi-conducting CNT stripes as active materials for solid-state devices such as field-effect transistors and chemical sensors is that multiple CNTs are organized in parallel in those devices. The parallel configuration can greatly reduce the total contact resistance, which is one of the major factors that limit the usefulness of current CNT devices for real-world applications. Electronic devices based on parallel CNTs are gaining increasing attentions in recent years as a practical solution for high-frequency field-effect transistors for advanced communication applications. The semi-conducting CNT stripes also make it possible to fabricate integrated circuits based on CNTs. Multiple CNT stripes can be deposited in an array on a substrate. Using conventional microelectronic fabrication processes, the stripes can be cut into segments on which transistors can be made. Integrated circuits can then be constructed by wiring those transistors by metal interconnects. The ability to deposit semi-conducting CNT stripes may lead to a significant advancement in developing CNT-based microelectronic devices and circuits.

CNT Network Reorganization

Figure 24:
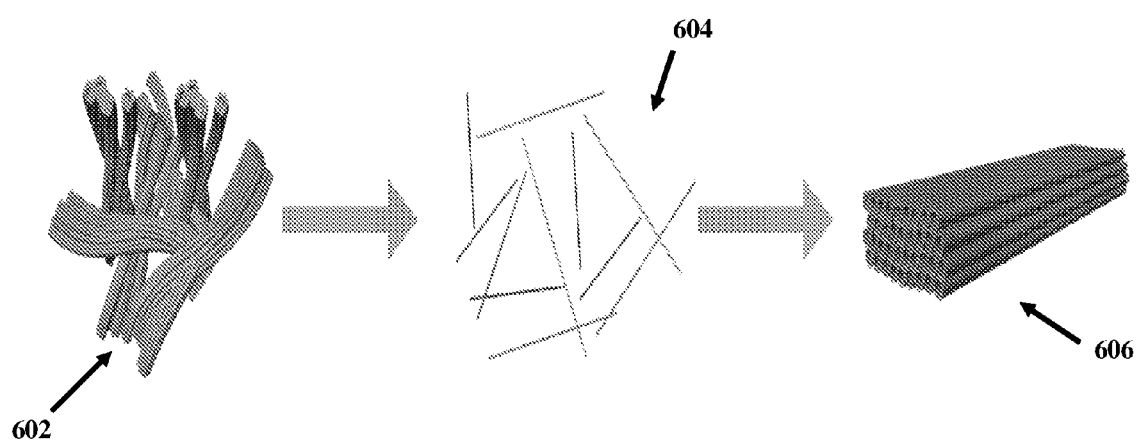
FIG. 24 illustrates carbon nanotube matrix reorganization schematic.
Figure 25:
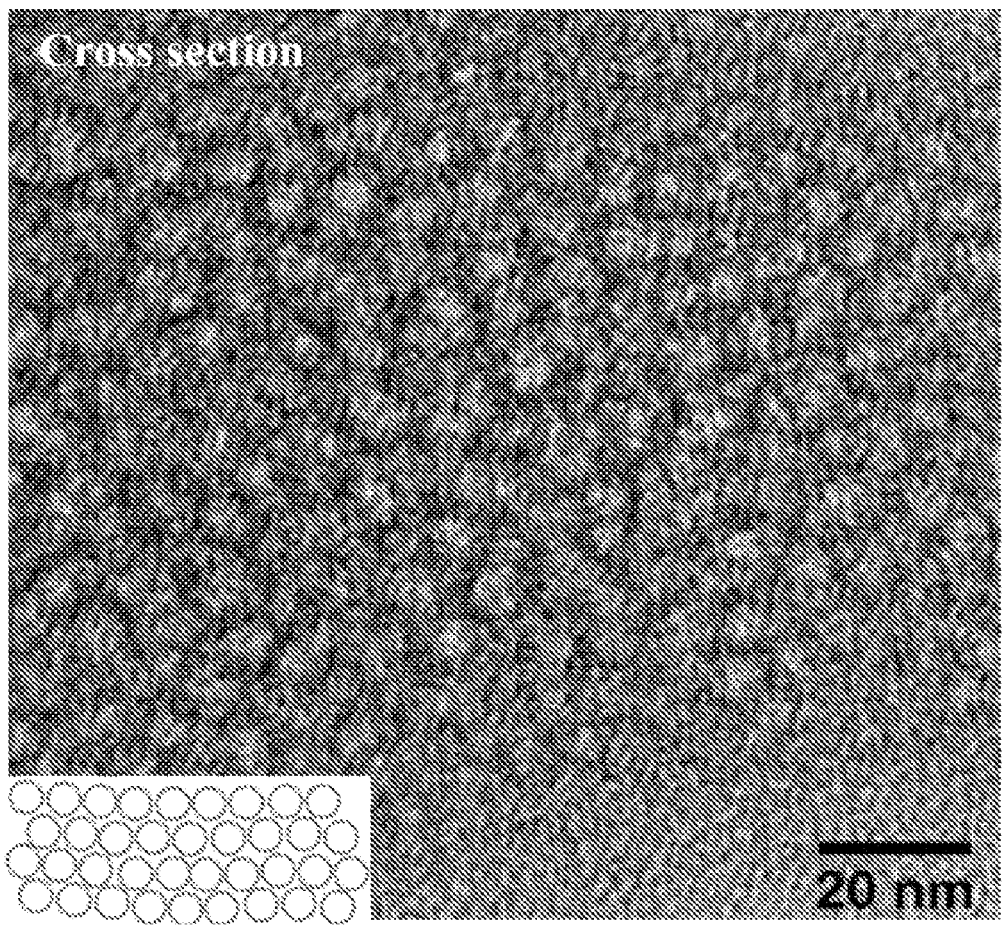
FIG. 25 is a transmission electron micrograph cross section of an aligned nanotube bundle array after matrix reorganization, and an inset diagram thereof.

As-grown CNT network usually have the form of long, curly and entangled ropes 602, in which CNTs form a partially ordered bundle as illustrated in FIG. 24. The invention presented here allows for the exfoliation and breakdown of the CNT ropes into straight individual nanotubes 604 and reorganization of the de-roped CNTs to form aligned bundles 606 with higher degree of ordering. In those highly ordered CNT bundles, 606 CNTs are parallel to each other in the rope to maximize the inter-tube interaction. The enhanced inter-tube interaction can greatly enhance the electrical, optical and mechanical properties of the CNT ropes, such as higher electric conductivity and higher tensile strength. This is analogous to amorphous (randomly entangled) and ordered (aligned) chain configuration in polymers such as nylon, whose mechanical properties are greatly affected by the chain configuration states. In the preliminary test, the aligned CNT stripes were embedded in epoxy resin and a thin-section of the cross-section of the aligned CNT stripes was cut for transmission-electron microscope (TEM) imaging. The TEM image the cross-section of bundled multi-wall CNTs and a schematic of the bundle cross-section configuration are shown in FIG. 25.

Aligned Carbon Nanotubes Stripes in Polymer Composites for Aircraft Anti-Lightning Application Aligned carbon nanotubes (CNT) stripes can be used to enhance the surface and bulk conductivity of polymer composites. Traditional bulk dispersion of carbon nanotubes in a polymer matrix can only achieve a conductivity level of lower than 0.01 S cm$^{-1}$ due to random orientation and distribution of CNTs in a three-dimensional space. Concentrating CNTs on the polymer surface can greatly enhance the surface conductivity due to higher local concentration of CNTs. If the CNTs are aligned in one dimension, the conductivity can be further enhanced because the effective path for electron conduction along the aligned direction is much shorter than that in a random network.

Aligned CNT stripes on an insulating substrate have been achieved using the alignment method disclosed in this invention. In preliminary experiments, a flat insulating substrate was covered by a template with microchannels. A pressure of $1\times10^6$ Pa was applied to ensure intimate contact between the substrate and the template. Suspension containing de-roped CNTs was forced through the microfluidic channels. The trapped suspension solution was then dried to deposit aligned CNTs on the surface of the insulating substrate.

Figure 26:
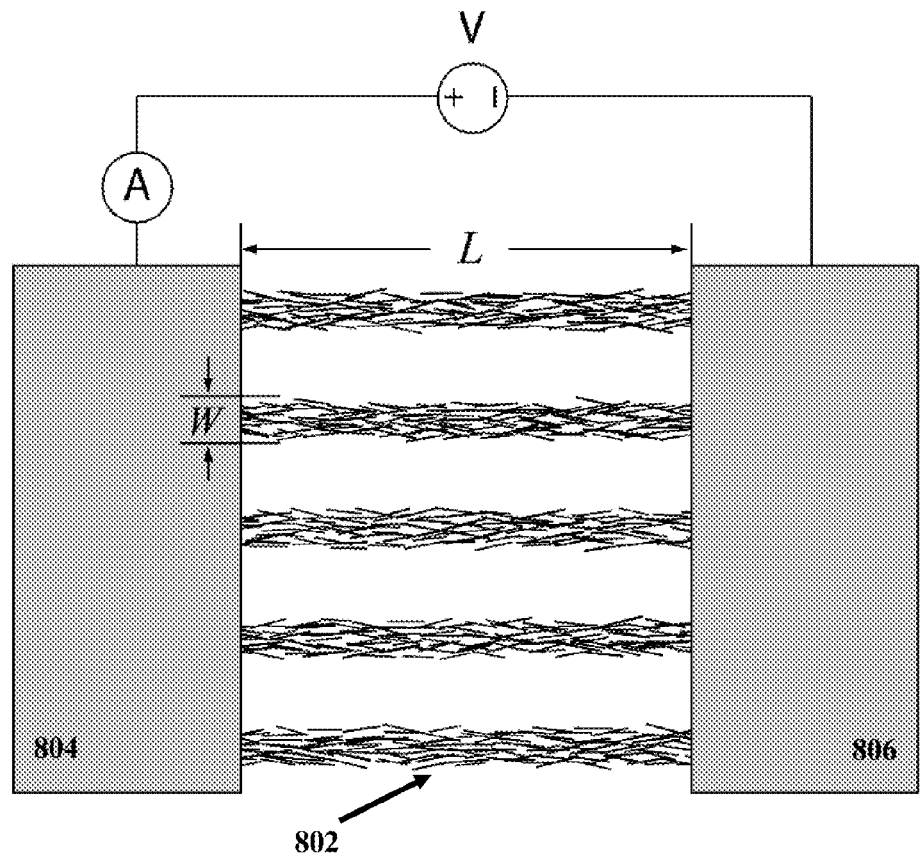
FIG. 26 is schematic and photograph for a microelectric device created by aligned nanotube deposition according to an embodiment of the invention.
Figure 26:
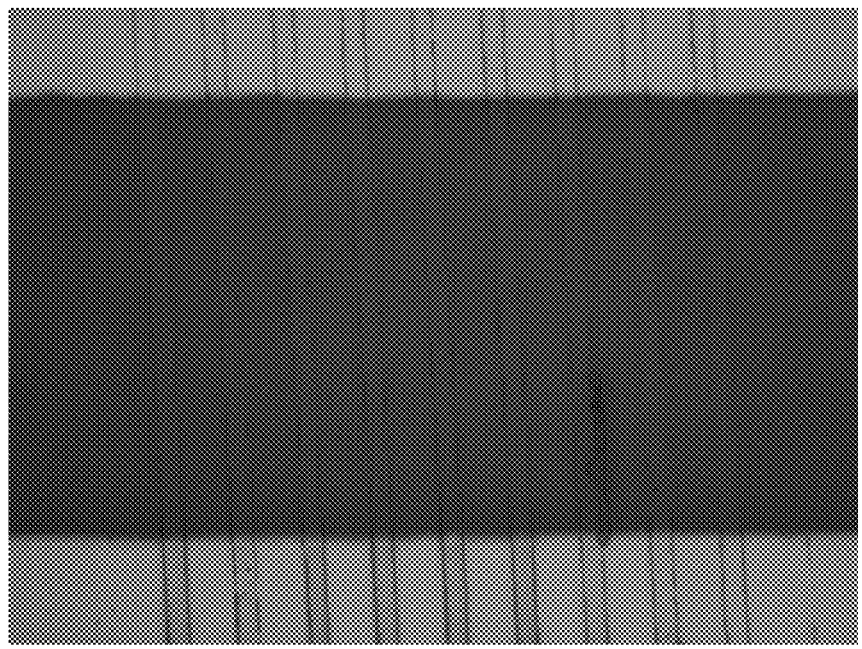

The conductivity of the aligned CNT stripes was measured by a two-probe technique as illustrated in FIG. 26A. After deposition of aligned CNT stripes 802 on the substrate, gold electrodes 804, 806 were evaporated using a shadow mask. The current between the two gold electrodes was measured as a function of voltage. Since in each measurement many CNTs are in parallel, the gold-CNT contact resistance is small and can be neglected. The conductivity of the aligned CNT stripe can then be obtained from the following simple equation:

$$\sigma = \frac{L}{RA} = \frac{L}{RNWt},$$

where L is the distance between the two electrodes, W is the width of each CNT stripe, R is the measured resistance, N is the number of CNT stripes, and t is the thickness of each CNT stripe. As illustrated, V is the voltage source and A is current measurement to monitor the device. For the sample corresponding to FIG. 24A the values of those parameters are: L=70 μm, R=40,000Ω (at 40V), N×W=40 μm, t≈0.3 μm. FIG. 26B shows an optical microscope image of a sample prepared by the above steps. The trapped suspension solution was then dried to deposit aligned CNTs on the surface of the insulating substrate.

Figure 27:
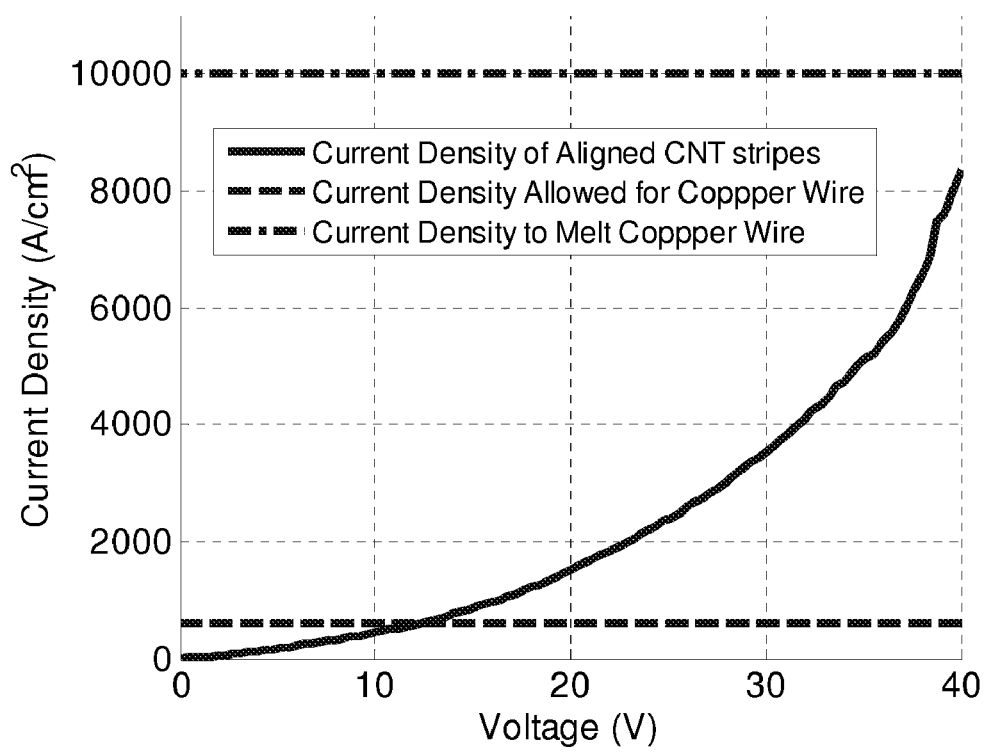
FIG. 27 illustrates a graph of current density in relation to applied voltage in aligned carbon nanotubes compared to copper wires.

A typical measured I-V curve is shown in FIG. 27. The calculated conductivity is 1.46 S cm$^{-1}$, and the current density at 40V is around 8,300 A cm$^{-2}$. The conductivity is about two orders of magnitude higher than the highest conductivity of polymer-CNT composite reported in literature. Those values are expected to be further improved if high quality CNT suspension is used. This potentially can lead to preparation of aligned CNT stripes with conductivity higher than 2000 S cm$^{-1}$ and current density much higher than 10,000 A cm$^{-2}$. The high conductivity and current carrying capacity of the aligned CNT stripes will make the present invention a viable solution for manufacturing of polymer composites for anti-lightening strike aerospace applications.

Flexible Electronic Applications for Aligned Nanotube Stripes

Precision placement of single CNT or multiple CNTs can enable ultra-compact chemical or biological sensors based on CNTs. After precision placement of CNTs on a substrate, electrodes can be fabricated on the two ends of the CNTs. When chemical or biological molecules are attached on the CNTs, the change of CNT conductivity can be probed by the change of conductance between the two electrodes. The invention described here allows for integration of such sensors with conventional CMOS electronics to acquire and process signals produced by the nano-sensors. Also, the 3D CNT scaffold can greatly increase the active surface area of a sensor device. This can significantly improve the sensitivity of the sensors based on CNTs.

Precision placement of multiple CNTs on a substrate also allows for the fabrication of microelectronic circuits based on CNTs. Owing to the high performance and ultra-small dimension of CNTs, these circuits can yield integration-level and performance unmatched by the state-of-the-art. Crossed CNTs are also proposed for ultra-small memory device. Precision placement of CNTs allows the fabrication of highly dense memory chips for future electronic systems.

The stripes of aligned CNTs formed by the techniques described in this invention can be stripped off from the substrate after alignment. Due to stronger interaction among CNTs in an aligned stripe, the mechanical strength of the stripe is expected to be high. Those stripes can be further processed to produce larger dimension objects. For example, braided CNT fibers can be used to produce ultra-strong laminates and textiles.

Conductive light-weight polymer nanocomposites containing ordered CNT stripes with greatly improved mechanical properties. Polymer-CNT nanocomposite films with aligned CNT stripes (in-plane, out-of-plane, or both) can also be used for advanced thermal management applications because of their good thermal conductivity along CNT alignment directions. Potential applications include heat dissipation and temperature control, heat conduction for thermoelectric devices that convert thermal energy into electric energy, and heat sink for the cooling of microelectronic chips. The aligned CNT stripe itself may be an interesting material for thermal-type infrared detector with fast response due to its high thermal conductivity.

The aligned CNT stripes can also be used for the study of biological cell behavior. It has been shown that substrate micro-textures can significantly affect the behavior of biological cells placed on those surfaces. In the past, most textured substrates are polymers or microelectronic materials such as silicon or silicon dioxide. The CNT stripe network (lines or grids) can also be used as physical constraints to study the behavior of cells. Moreover, the conductive CNT stripes allow electric field or electric current to be applied in situ for cell study. One important example is to study how the neuron cells develop connectivity under external stimuli such as a static electric field or an electric current. Aligned CNTs have a potential for biomedical therapy and related device applications.

Flexible electronics are electric devices that are built on flexible substrates. The mechanical flexibility and large surface area enable many attractive applications, such as foldable large-area antennas or flexible sensor and actuator arrays that can be easily mounted on the surface of airplanes. Most current flexible electronics are based on organic semiconductors such as poly(3-hexylthiophene) for easy processing. However, due to its intrinsic material properties, organic devices and circuits are known to have limited performance. An alternative approach to circumvent the material issue is to use traditional inorganic semiconductors with high performance. Recently novel techniques of attaching silicon or GaAs thin stripes on flexible substrate have been developed to enable flexible electronics with improved performance. CNTs are known to be superior semi-conducting materials, and the aligned-CNT stripes obtained from microchannel alignment of high quality CNT dispersion prevents a feasible route to realize high performance flexible electronics based on CNTs.

There are several advantages using the techniques outlined in this proposal to build flexible electronics. Firstly, the non-linear current-voltage characteristics of the aligned-CNT stripes shown in the preliminary results indicate that the dispersion contains mainly semiconducting CNTs. After further enrichment of semiconducting CNTs, the aligned-CNT stripes will consist of only semiconducting CNTs. This is very important for transistor devices because the elimination of the conducting CNTs can result in very low off current and enhanced gate control on source/drain current, both are essential for improving circuit performance. Secondly, the aligned-CNT stripes contain a large number of CNTs in parallel, which can lead to low contact resistance. Though field-effect transistors have been made on a single CNT, they have large contact resistance due to the existence of Schottky barrier at the contacts, which renders them low performance and not suitable for high frequency circuit applications. It has been proposed that a solution to use CNT transistors in high speed and high frequency circuits is to use multiple CNTs in parallel. The aligned-CNT stripes, containing hundreds to thousands parallel CNTs, are thus ideal for such application. Lastly, the preparation method is based on solution processing, which is suitable for flexible substrate while traditional CVD-based deposition techniques cannot be used on plastic films with low melting point.

Figure 28:
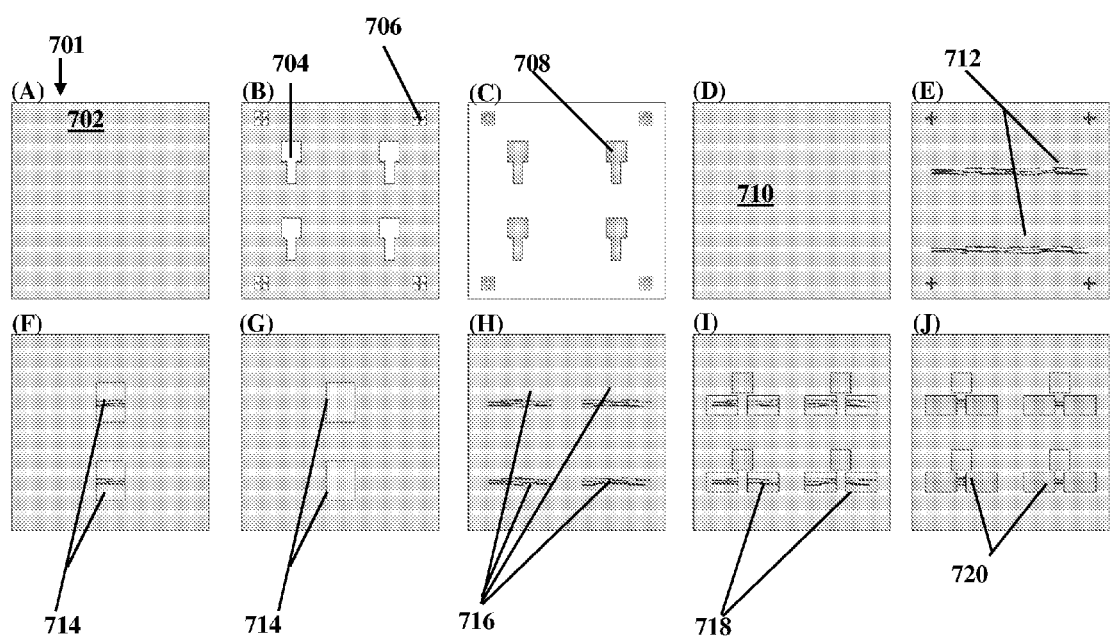
FIG. 28 illustrates a manufacturing process for application according to an embodiment of the invention.

The fabrication of the field-effect transistors based on the aligned-CNT stripes is depicted in FIG. 28. In FIG. 28A, starting with a plastic substrate 701, photoresist 702 will be applied on the substrate by spin-coating or dip-coating. For spin-coating, the flexible substrate can be fixated on a special chuck in the spin-coater. The chuck has distributed vacuum holes to flatten and hold the flexible substrate for spin-coating. The bottom gate electrode 704 and alignment mark 706 patterns will be defined in the photoresist by photolithography as in FIG. 28B. Gold thin film is evaporated on the photoresist and lift-off in acetone will yield gold electrodes 708 on the substrate shown in FIG. 28C. FIG. 28D illustrates a curable polymeric gate dielectric 710 is then applied on the substrate by spin- or dip-coating. Polymeric dielectric is used here instead of deposited inorganic dielectrics for better device reliability because bending of the flexible substrate tends to create cracks in inorganic dielectric thin films. The aligned-CNT stripes 712 are then deposited on the gate dielectric using the microchannel template as shown in FIG. 28E. Since the CNT stripes are long, they must be cut into segments to provide good isolation between devices. To achieve this, photolithography will be used to open windows 714 where CNT stripes need to be removed. The exposed portion of the aligned-CNT stripes will be removed by oxygen reactive-ion etching as illustrated in FIGS. 28F and G. After removing the photoresist, short segments of aligned-CNT stripes 716 are left on the substrate such that the results look like FIG. 28H. The source/drain electrode pattern 718 can then be defined by photolithography as shown in FIG. 28I. Finally evaporation of palladium and lift-off in acetone for source/drain electrodes 720 complete the fabrication process. The top source/drain electrode 720 and the choice of palladium electrode with high work-function and good wetting on CNT will ensure low contact resistance for better device performance.

Applications for Aligned De-Roped Carbon Nanotubes

The versatile fabrication of polymer composites containing aligned CNT stripes and the precision placement of CNT on a substrate can have a broad range of applications. The following is a list of applications that are enabled by the invention described herein. This list is not all-inclusive and its purpose is to show the potential impact of this invention. Examples of applications in which the disclosed methods may be useful include without limitation, aerospace applications (e.g. conductive layers), microelectronics (e.g. actuators), photovoltaic applications (e.g. solar cells), various biological applications (e.g. biosensors), and other applications known to those of skill in the art where nanotubes may be incorporated.

Polymer sheets and films with good thermal and electrical conductivity can be used as surface coating for electrostatic charge dissipation. Highly conductive polymer sheets and films can be used to dissipate large current for anti-lightening applications. Polymer nanocomposites can be used to build the body of an aircraft or a vehicle to lower their weight for energy efficiency. A typical aircraft or a vehicle made with polymer composites is susceptible to lightening strike, which poses grave danger to the passengers inside the aircraft or vehicle. By applying the aircraft or vehicle with polymer films or sheets with aligned CNT, the threat of lightening strike can be minimized without sacrificing the benefits brought about by polymer composites.

Precision placement of single CNT or multiple CNTs at a designed location of interest can revolutionize the microelectronic industry. This allows microelectronic devices to take full advantage of the superior electronic properties of the CNT such as its high carrier mobility and ultra-small dimension. Ultra-high speed and ultra-high frequency transistors and diodes can be made from CNTs to improve the performance of the next generation microelectronic circuits. A transistor or a diode can also be made from multiple parallel CNTs to reduce contact resistance. Those devices are important in a variety of high-frequency RF applications.

While the preferred embodiments of the invention have been shown and described, modifications thereof can be made by one skilled in the art without departing from the spirit and teachings of the invention. The embodiments described and the examples provided herein are exemplary only, and are not intended to be limiting. Many variations, combinations and modifications of the invention disclosed herein are possible and are within the scope of the invention. Accordingly, the scope of protection is not limited by the description set out above, but is only limited by the claims which follow, that scope including all equivalents of the subject matter of the claims.

We claim:

1. A nanocomposite comprising at least one nanotube; wherein said nanotube is associated with at least one nanoplatelet, and wherein said nanotube is an exfoliated nanotube.

2. The nanocomposite of claim 1, wherein the at least one nanotube is selected from the group consisting of carbon nanotubes, tungsten dioxide nanotubes, silicon nanotubes, inorganic nanotubes, and combinations thereof.

3. The composite of claim 1, wherein the nanotube comprises an aspect ratio of at least about 10.

4. The nanocomposite of claim 1, wherein the at least one nanoplatelet comprises a material selected from the group consisting of clay, nanoclay, graphite, inorganic crystal, organic crystal or combinations thereof.

5. The nanocomposite of claim 4, wherein at least one nanoplatelet comprises an aspect ratio of at least about 10.

6. The nanocomposite of claim 1, wherein the nanoplatelet to nanotube mass ratio is in the range of about 0.1 to about 10.

7. The nanocomposite of claim 1, wherein the at least one nanoplatelet is associated with at least one nanotube by an attractive interaction.

8. The nanocomposite of claim 7, wherein the at least one nanotube is reversibly associated with the at least one nanoplatelet.

9. The nanocomposite of claim 8, wherein the at least one nanotube comprises a nanotube suspended in a surfactant and disassociated with the at least one nanoplatelet.

10. A process for manufacturing the nanocomposite of claim 1 comprising:
   a) adding at least one nanotube to a first solution, wherein the first solution oxidizes the nanotube;
   b) isolating the nanotube from the first solution and resuspending the nanotube in aqueous solvent to form an oxidized nanotube solution;
   c) adding at least one nanoplatelet to a second solution, wherein the second solution exfoliates the nanoplatelet;
   d) isolating the nanoplatlet from the base solution and resuspending the nanotube in aqueous solvent to form an exfoliated nanoplatelet solution; and
   e) admixing the oxidized nanotube solution and exfoliated nanoplatelet solution to form a mixture comprising at least one exfoliated nanotube associated with the at least one nanoplatelet.

11. The process of claim 10, wherein the at least one nanotube comprises nanotube is selected from the group consisting of carbon nanotubes, tungsten dioxide nanotubes, silicon nanotubes, inorganic nanotubes, and combinations thereof.

12. The process of claim 10, wherein the first solution comprises at least one acid.

13. The process of claim 10, wherein said solution is a mixture, an emulsion or a suspension.

14. The process of claim 10, wherein at least one nanotube is isolated from the first solution by filtering under vacuum.

15. The process of claim 10, wherein at least one oxidized nanotube is dispersed in an aqueous solution by sonication.

16. The process of claim 10, wherein the second solution comprises at least one base.

17. The process of claim 10 wherein the nanotubes and the nanoplatelets are admixed at a nanoplatelet to nanotube mass ratio of at least 1:0.01.

18. The process of claim 10, wherein admixing the nanoplatelets and the nanotubes, comprises a nanoplatelets to nanotubes mass ratio of at least about 1.1 to about 1.

19. The process of claim 10, wherein admixing the nanoplatelet solution and nanotube solution further comprises mechanical homogenization.

20. An exfoliated nanotube dispersion prepared by a process comprising:
   a) adding at least one nanotube to a first solution, wherein the first solution oxidizes the at least one nanotube;
   b) isolating the nanotube from the first solution and resuspending the at least one nanotube in aqueous solvent to form an oxidized nanotube solution;
   c) adding at least one nanoplatelet to a second solution, wherein the second solution exfoliates the at least one nanoplatelet;
   d) isolating the nanoplatelet from the base solution and re-suspending the at least one nanotube in aqueous solution to form an exfoliated nanoplatelet solution;

e) admixing the oxidized nanotube solution and exfoliated nanoplatelet solution to form a nanocomposite comprising at least one exfoliated nanotube associated with the at least one nanoplatelet;

f) altering the ionic strength of the nanocomposite solution to remove the at least one nanoplatelet; and g) resuspending the at least one exfoliated nanotube.

21. The nanotube dispersion of claim 20, wherein the at least one nanotube is selected from the group consisting of carbon nanotubes, tungsten dioxide nanotubes, silicon nanotubes, inorganic nanotubes, and combinations thereof.

22. The nanotube dispersion of claim 20, wherein the nanotube is at least 1% oxidized in said first solution.

23. The nanotube dispersion of claim 20, wherein the dispersion is a suspension, a mixture, an emulsion or a solution.

24. The nanotube dispersion of claim 20, wherein at least one nanotube is isolated from the first solution by filtering under vacuum.

25. The nanotube dispersion of claim 20, wherein the at least one oxidized nanotube is dispersed in an aqueous solution by sonication.

26. The nanotube dispersion of claim 20, wherein the second solution comprises at least one surfactant.

27. The nanotube dispersion of claim 20, wherein the nanotubes and the nanoplatelets are admixed at a nanotube to nanoplatelet mass ratio of at least 1:1.

28. The nanotube dispersion of claim 20, wherein admixing the nanoplatelets and the nanotube comprises the nanoplatelets to nanotubes mass ratio of at least about 1.1 to about 1.

29. The nanotube dispersion of claim 20, wherein admixing the nanoplatelet solution and nanotube solution further comprises mechanical homogenization.

30. The nanotube dispersion of claim 20, wherein the altering the nanocomposite solution ionic strength comprises admixing a salt solution with a concentration between about 0.005 mol/L and about 0.50 mol/L.

31. The nanotube dispersion of claim 30, wherein the salt solution comprises KCl.

32. The nanotube dispersion of claim 20, wherein altering the nanocomposite solution ionic strength comprises changing the pH.

33. The nanotube dispersion of claim 20, further comprising precipitation to remove the at least one nanoplatelet.

34. The nanotube dispersion of claim 20, further comprising centrifugation to remove the at least one nanoplatelet.

35. The nanotube dispersion of claim 20, wherein the isolated at least one nanotube is re-suspended in surfactant.

36. A method of manipulating nanotubes comprising:

a) oxidizing at least one nanotube to form at least one oxidized nanotube;

b) exfoliating at least one nanoplatelet to form at least one exfoliated nanoplatelet;

c) admixing the at least one oxidized nanotubes and the at least one exfoliated nanoplatelet form a homogenously dispersed nanotube solution comprising at least one exfoliated nanotube;

d) injecting the nanotube solution into a template supported by a substrate, wherein the template comprises at least one microchannel, causing the alignment of nanotubes within said microchannel;

e) removing the liquid from the solution to deposit a nanotube film on the substrate; and f) removing the template from the substrate, such that an aligned nanotube film is left on the substrate.

37. The method of claim 36, herein at least one nanotube is selected from the group consisting of carbon nanotubes, tungsten dioxide nanotubes, silicon nanotubes, inorganic nanotubes, and combinations thereof.

38. The method of claim 36, wherein said solution is a mixture, an emulsion, a suspension, a colloid, a sol or a gel.

39. The method of claim 36, wherein (a) comprises admixing the nanotubes in an acid solution.

40. The method of claim 39, wherein the acid solution comprises an oxidative environment.

41. The method of claim 39, wherein vacuum filtering said acid solution to isolate the at least one nanotube.

42. The method of claim 36, wherein after (a) dispersing the at least one oxidized nanotube in an aqueous solution by sonication.

43. The method of claim 36, wherein (b) comprises admixing the nanoplatelets in a basic solution.

44. The method of claim 42, wherein the aqueous solution comprises an active media.

45. The method of claim 36, wherein (c) comprises admixing an aqueous solution of nanotubes into an aqueous solution of nanoplatelets.

46. The method of claim 36, wherein (c) comprises admixing an aqueous solution of nanoplatelets into an aqueous solution of nanotubes.

47. The method of claim 36, wherein (c) comprises admixing an aqueous solution of nanoplatelets and an aqueous solution of nanotubes simultaneously.

48. The method of claim 36, wherein (c) comprises of admixing the nanotubes and the nanoplatelets at a nanotube to nanoplatelet ratio of at least 1:1.

49. The method of claim 36, wherein (c) comprises of admixing the nanoplatelets and the nanotubes, at a nanoplatelets to nanotubes ratio greater than about 1.1 to about 1.

50. The method of claim 36, wherein (c) comprises homogenizing the mixture at a temperature range from about 30° C. to about 40° C. for a time period in the range of from about 5 to about 6 hours.

51. The method of claim 36, wherein step (c) further includes the steps:

c') altering the ionic strength of the solution;

c") separating the dissociated exfoliated nanotubes from said nanoplatelets in solution, to form said homogenously dispersed nanotube solution.

52. The method of claim 36, further comprising drying the exfoliated nanotubes to form a powder, and re-dispersing the powder in solvent after step (c).

53. The method of claim 52, wherein drying the exfoliated nanotubes comprises drying at about 100° C. until the water is evaporated.

54. The method of claim 52, wherein the solvent is an organic solvent.

55. The method of claim 52, wherein the solvent is an inorganic solvent.

56. The method of claim 54, wherein the organic solvent is selected from acetone, toluene, and combinations thereof.

57. The method of claim 54, further comprising dissolving polyvinyl alcohol (PVA) into the organic solvent.

58. The method of claim 55, further comprising admixing epoxy monomer solution into the inorganic solvent.

59. The method of claim 58, further comprising admixing inorganic solution of dispersed nanotubes into the epoxy monomer.

60. The method of claim 58, further comprising admixing epoxy monomer and the inorganic solution of dispersed nanotubes simultaneously.

61. The method of claim 51, wherein (c") comprises stabilizing the dissociated-exfoliated nanotubes in a solution.

62. The method of claim 61, further comprising suspending in a solution comprising at least one selected from solvents, surfactants, polymers, proteins, nucleic acids and combinations there of to stabilize the nanotubes in solution.

63. The method of claim 36, wherein the at least one microchannel comprises a fluid vessel.

64. The method of claim 36, wherein the at least one microchannel is in the substrate or a bulk material.

65. The method of claim 36, wherein the at least one microchannel has a cross-sectional dimension that is smaller than about the length of the nanotubes.

66. The method of claim 36, wherein injecting the nanotube suspension into the at least one microchannel aligns the nanotubes.

67. The method of claim 36, wherein the substrate is selected from the group consisting of polymers, semiconductors, metals, alloys, wafers, plastics, glasses, thin films and combinations thereof.

68. The method of claim 36, wherein the nanotube film comprises aligned nanotubes.

69. The method of claim 36, wherein injecting the nanotube solution comprises applying negative pressure to said solution.

70. The method of claim 36, wherein injecting the nanotube suspension comprises immersing the substrate in said suspension.

71. The method of claim 36, wherein (d) comprises injecting the nanotube suspension using at least one injection nozzle.

72. The method of claim 36, wherein removing the solution to deposit the nanotube film comprises drying the solution.

73. The method of claim 36, wherein removing the solution to deposit the nanotube film comprises evaporating the solution.

74. The method of claim 36, wherein the substrate includes at least one substrate layer.

75. The method of claim 74, wherein the at least one substrate layer includes via holes extending between at least two layers.

76. The method of claim 75, wherein the least two layers are fused by transfer bonding.

77. The method of claim 75, wherein the via holes are microchannels between at least two substrate layers.

78. The method of claim 36, wherein the substrate further comprises previously deposited nanotubes.

79. The method of claim 78, wherein the previously deposited nanotubes are in any orientation.

80. The method of claim 75, wherein the substrate comprises aligned nanotubes.

81. The method of claim 36, wherein (a) further comprises oxidizing the nanotubes in an oxidative environment.

82. The method of claim 81, wherein the nanotubes are oxidized by dry oxidation, radiation oxidation, plasma oxidation, thermal oxidation, diffusion oxidation or combinations thereof.

83. The method of claim 36, wherein (b) further comprises exfoliating the nanoplatelets in a chemically active media.

84. A method for placing at least one nanotube in a specific location comprising:
  a) altering the substrate surface to include a nanotube receptor;
  b) positioning a template on the substrate surface over the nanotube receptor;
  c) injecting an exfoliated nanotube suspension into the template, wherein the template comprises at least one microchannel, said microchannel for aligning nanotubes; and
  d) allowing at least one nanotube to associate with the nanotube receptor.

85. The method of claim 84, wherein the nanotube suspension comprises dispersed, de-roped or de-bundled nanotubes in liquid.

86. The method of claim 84, wherein the substrate selected from the group consisting of polymers, semiconductor, metals, wafers, plastics, glasses, thin films and combinations thereof.

87. The method of claim 84, wherein the nanotube receptor is chemically modified.

88. The method of claim 84, wherein the nanotube receptor is physically modified.

89. The method of claim 84, wherein the as least one microchannel comprises a fluid vessel.

90. The method of claim 89, wherein the at least one microchannel has a cross-sectional dimension that is smaller than about the length of the nanotubes.

91. The method of claim 84, wherein injecting the nanotube suspension into the at least one microchannel aligns the nanotubes with the nanotube receptor.

92. The method of claim 84, wherein the nanotube is bonded to the nanotube receptor.

93. The method of claim 84, wherein the nanotube is physically constrained by the nanotube receptor.

94. A method of preventing aggregation of nanotubes in a liquid medium, comprising:
  forming a dispersion of nanocomposites in said liquid medium, wherein each said nanocomposite comprises at least one exfoliated nanotube associated with at least one nanoplatelet.

95. The method of claim 94, wherein forming the nanocomposite further comprises
  a) adding at least one nanotube to an oxidizing solution, wherein the oxidizing solution oxidizes the at least one nanotube;
  b) isolating the nanotube from the acid solution and resuspending the at least one nanotube in aqueous solvent to form an oxidized nanotube solution;
  c) adding at least one nanoplatelet to a basic solution, wherein the base solution exfoliates the at least one nanoplatelet;
  d) isolating the at least one nanoplatelet from the base solution and re-suspending the nanotube in aqueous solution to form an exfoliated nanoplatelet solution; and
  e) admixing the oxidized nanotube solution and exfoliated nanoplatelet solution to form a nanocomposite comprising at least one nanotube associated with the at least one nanoplatelet.

96. The method of claim 95, wherein (a) further comprises oxidizing the nanotubes in an oxidative environment.

97. The method of claim, 96, wherein the nanotubes are oxidized by dry oxidation, radiation oxidation, plasma oxidation, thermal oxidation, diffusion oxidation or combinations thereof.

98. The method of claim 95, wherein (c) further comprises exfoliating the nanoplatelets in a chemically active media.

99. The method of claim 94, further comprising:
  a) altering the ionic strength of the nanocomposite solution to remove the at least one nanoplatelet; and
  b) re-suspending the at least one exfoliated nanotube.

100. The method of claim 99, wherein the altering the nanocomposite solution ionic strength comprises admixing a salt solution with a concentration between about 0.005 mol/L and about 0.50 mol/L.

101. The method of claim 100, wherein the salt solution comprises KCL.

102. The method of claim 99, wherein altering the nanocomposite solution ionic strength comprises changing the pH.

103. The method of claim 99, wherein further comprising centrifugation to remove the at least one nanoplatelet.

104. The method of claim 99, wherein the isolated at least one nanotube is re-suspended in a solution comprising at least one selected from solvents, surfactants, polymers, proteins, nucleic acids and combinations there of.

105. The method of claim 99, where in the at least one nanotube is re-suspended in a solution to stabilize the nanotube.

* * * * *